United States Patent [19]

Niwa et al.

[11] 4,455,065
[45] Jun. 19, 1984

[54] OPTICAL DEVICE

[75] Inventors: Yukichi Niwa; Mitsutoshi Ohwada; Yasuo Ogino, all of Yokohama; Kazuo Tanaka, Tokyo; Noboru Koumura, Narashino, all of Japan

[73] Assignee: Canon Kabushiki Kaisha, Tokyo, Japan

[21] Appl. No.: 282,037

[22] Filed: Jul. 9, 1981

[30] Foreign Application Priority Data

Jul. 15, 1980 [JP] Japan .................................. 55-96593
Sep. 25, 1980 [JP] Japan .................................. 55-134112

[51] Int. Cl.³ ............................................ G02B 27/00
[52] U.S. Cl. .................................... 350/445; 356/4
[58] Field of Search ............... 350/445, 446; 354/56; 356/4

[56] References Cited

U.S. PATENT DOCUMENTS

| | | | |
|---|---|---|---|
| 3,756,697 | 9/1973 | Nakamura | 350/445 |
| 4,357,085 | 11/1982 | Niwa et al. | 350/423 |
| 4,384,199 | 5/1983 | Ogino et al. | 250/204 |

OTHER PUBLICATIONS

Tibetts, et al., "Scanning Lens", IBM Technical Disclosure Bulletin, vol. 14, No. 11, 4/72, pp. 3062-3263.

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

An optical device in which the projecting beam from beam projector is projected to outside through a part area of an imaging optical system and, of the reflected beam reflected by the outside and entering the imaging optical system, the reflected beam passing through another area of the imaging optical system is received by photoelectric light-receiving element and wherein the beam projecting optical axis of the beam projector and the light-receiving optical axis of the photoelectric light-receiving element are set so that the point of intersection between each of the optical axes and the principal plane of the imaging optical system does not satisfy, on the principal plane, a point-symmetrical relationship with respect to the point of intersection between the principal plane and the optical axis of the imaging optical system.

31 Claims, 36 Drawing Figures

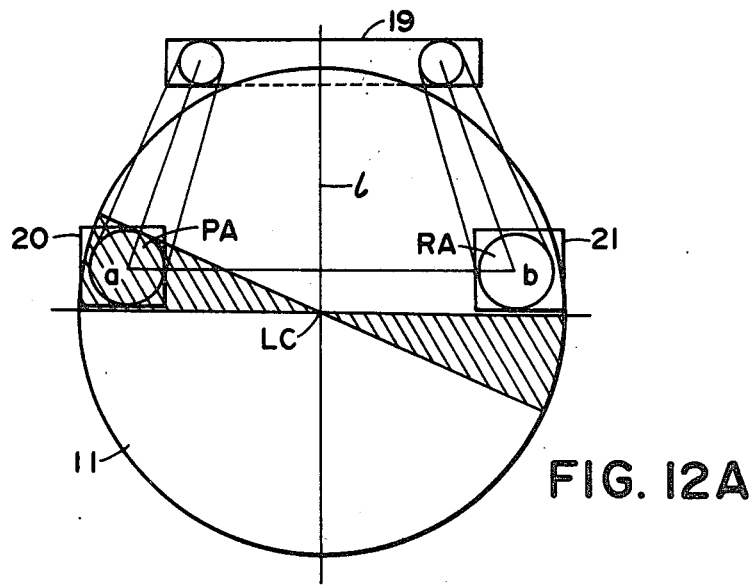
FIG. 12A
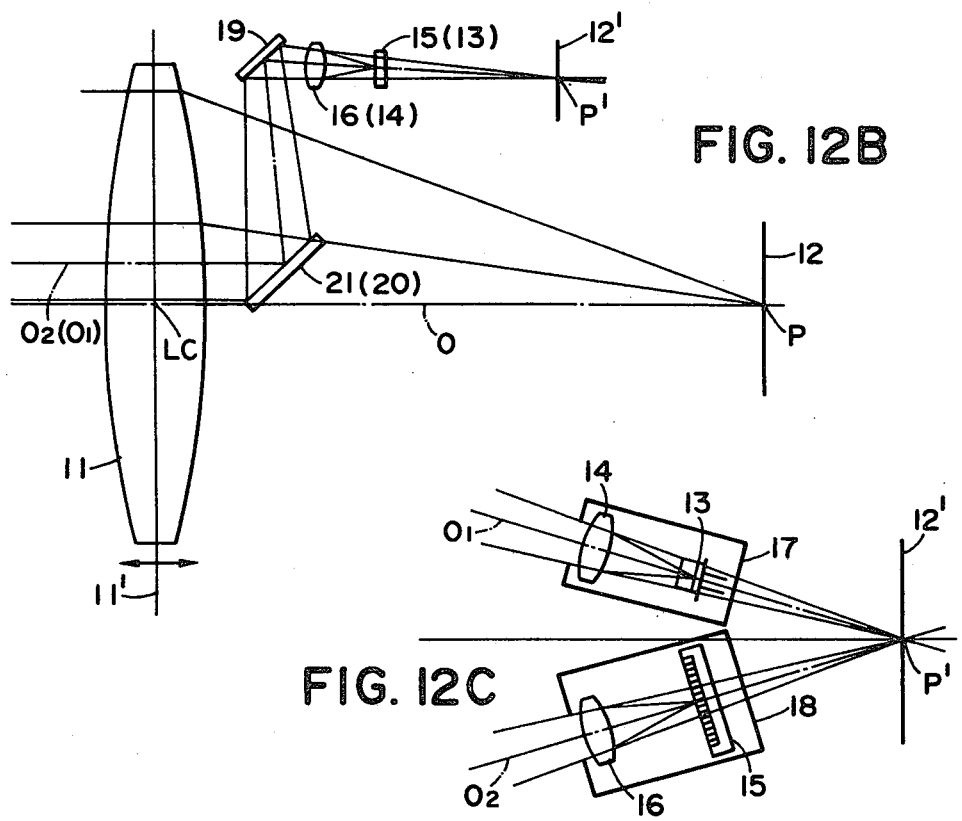
FIG. 12B
FIG. 12C

OPTICAL DEVICE

BACKGROUND OF THE INVENTION

1. Field of the Invention

This invention relates to an optical device, and more particularly to an optical device in which the projecting beam from beam projector means is projected to outside through a part area of an imaging optical system and, of the reflected beam reflected by the outside and entering the imaging optical system, the reflected beam passing through another area of the imaging optical system is received by photoelectric light-receiving means.

2. Description of the Prior Art

In the field of measuring the distance to an object or detecting the state of focus of an imaging optical system with respect to an object, there is a so-called active distance measuring device or focus detecting device in which beam projector means is provided on the device side and a beam is projected from this beam projector means toward the object so that by utilizing a variation in the position of incidence, on a predetermined surface, of the then reflected beam from the object, the distance to the object is detected or the state of focus of the imaging optical system with respect to the object is detected. As such an active distance measuring device or focus detecting device, a TTL type focus detecting system has been proposed by applicant in Japanese Patent application No. 64747/1978 (Japanese Laid-open Patent application No. 155832/1979, whose U.S. counterpart is U.S. Ser. No. 43,250) now U.S. Pat. No. 4,357,085. As an embodiment in this previous proposition, there is disclosed a device in which a beam projector and a photoelectric light receptor are disposed rearwardly of an imaging optical system adjustable along the optical axis thereof and, of the reflected beam projected from the beam projector through a part area of the imaging optical system and then reflected by the object and entering the imaging optical system, the center of gravity of the beam entering the photoelectric light receptor through another area of the imaging optical system is displaced on a plane containing the light-receiving surface of the photoelectric light receptor in accordance with adjustment of the imaging optical system, so that the center of gravity of this beam is detected by utilization of the output of the photoelectric light receptor, whereby the state of focus of the imaging optical system with respect to the object may be detected to enable in-focus and out-of-focus and in addition, directionality of defocus during out-of-focus, namely, near-focus or far-focus, to be discriminated depending on the construction of the photoelectric light receptor in particular. A similar device is also disclosed as an embodiment in U.S. Pat. No. 4,384,199.

In such a TTL type active focus detecting device, a beam projector and a photoelectric light receptor are disposed at positions conjugate with a predetermined position on the prearranged imaging plane of an imaging optical system and therefore, when light is projected from the beam projector onto an object through a part area of the imaging optical system, part of the light beam reflected by the inner surface of a lens constituting the imaging optical system may enter the photoelectric light receptor. That is, the light beam having entered the imaging optical system from the beam projector is projected onto the object through a part area of the imaging optical system while, on the other hand, part of the light beam may return by the inner surface reflection in the imaging optical system and in this case, the light emerges as a divergent beam where the surface of the lens constituting the imaging optical system is convex, and the light emerges as a condensed beam where the surface of such lens is concave. Such light beam may enter the photoelectric light-receiving surface and the light beam which is a condensed beam and which enters the vicinity of the photoelectric light-receiving surface is great in energy intensity and has an adverse effect.

On the other hand, the energy intensity of the signal beam which is projected onto the object and then reflected by the object surface and enters the photoelectric light-receiving surface through the imaging optical system decreases in inverse proportion to the square of the object distance and also decreases in proportion to the reflection factor of the object. Further, the energy density also decreases where the projected beam pattern on the photoelectric light-receiving surface is bad in imaged condition and blurred. In the above-described device, the condition in which the signal beam is very weak like this must also be detected and if detection of weak light is possible, detection of in-focus with respect even to an object at a long distance and of low reflection factor is possible.

Under such a situation, the beam emerging by virtue of the inner surface reflection in the imaging optical system provides ghost or flare with respect to the signal beam which is projected onto an object and then reflected by the surface of the object and enters the photoelectric light-receiving surface through a part area of the imaging optical system, and overlaps with such signal beam and can no longer be separated therefrom by an electrical or optical method.

On the other hand, it is apparent that such ghost or flare is smaller in their influence as the frequency of the inner surface reflection increases and as the condensing property on the photoelectric light-receiving surface is smaller. Also, even if the beam is a condensed beam, where it is condensed at a position remote from the photoelectric light-receiving surface, there is little or no influence. However, the actual imaging optical system is great in number of lenses forming it and it is very rare that there is no ghost or flare which satisfies the conditions for entering the photoelectric light-receiving surface. As regards the energy intensity of ghost or flare, it is about $0.5 \times 10^{-13}$W to about $1 \times 10^{-3}$W, when a beam of 1 mW is projected from a light-emitting device and if all of the light beam after five inner surface reflections enters the photoelectric light-receiving surface. Such energy intensity is within a detectable limit for a photosensor such as a conventional Si-PIN photodiode and is of course a detectable energy amount for a photosensor having an accumuation effect such as CCD. Accordingly, where such an element is employed as the light receptor, the influence of ghost or flare resulting from at least five inner surface reflections becomes significant. Such ghost or flare fluctuates for the movement of the imaging optical system resulting from focus adjustment thereof, whereby the distribution of quantity of light on the photoelectric light-receiving surface varies and therefore, this becomes a decisive impediment in a system for detecting movement of the center of gravity of a signal beam.

As a method for reducing such ghost or flare, there would occur to mind counter-measures such as reducing the reflection factor of each lens surface, designing an imaging optical system in which there is no beam which returns to the photoelectric light-receiving surface and is condensed, and selecting a predetermined conjugate point position to thereby install the light-emitting device and the photoelectric light-receiving surface at portions free of influence, but such countermeasures could not be a positive method for avoiding ghost or flare and have thus been great limitations in designing.

SUMMARY OF THE INVENTION

In view of such circumstances, it is a primary object of the present invention to provide a more advantageous improvement which can eliminate all of the above-noted inconveniences of an optical device in which the projecting beam from beam projector means is projected to outside through a part area of an imaging optical system and the reflected beam reflected by the outside inter the imaging optical system through another area of the imaging optical system to be received by photoelectric light-receiving means.

It is another object of the present invention to provide a novel and excellent form of the optical device in which all of the above-noted problems of ghost or flare on the photoelectric light-receiving surface are eliminated for any type of imaging optical system, whereby the decisive malfunctioning of the TTL type active focus detecting device can be completely eliminated and the range of the applicable imaging optical system can be expanded and even in a case where the quantity of incident light is weak such as when the reflection factor of an object is low or when the object lies at a long distance, focus detection can be accomplished with high accuracy and which is simple in construction and consequently in adjustment and whose mechanical stability and sturdiness can be enhanced and whose variation with time can be minimized.

Under such objects, the present invention is characterized in that the beam projecting optical axis of the beam projector means and the light-receiving optical axis of the photoelectric light-receiving means are set so that the point of intersection between each of said optical axes and the principal plane of the imaging optical system does not satisfy, on said principal plane, a point-symmetrical relationship with respect to the point of intersection between said principal plane and the optical axis of the imaging optical system.

It is still another object of the present invention to provide an optical system which is compact as a whole in spite of containing an active automatic focus detecting device used in an optical instrument such as a camera, in a TTL fashion and within a lens system.

It is yet still another object of the present invention to provide an optical system provided with the above-described TTL type active automatic focus detecting device which suffers less from malfunctioning in focusing operation.

In the optical system according to the present invention, it is intended to achieve the above objects by using a member for propagating the beam by utilization of total reflection, as a light-directing member for directing the beam from light-emitting means emitting a distance measuring beam which is provided outside of the light path of the optical system to the focusing optical member and for directing the beam reflected by an object to be measured and passing through the focusing optical member to the light-receiving means provided outside of the light path of the optical system. This light-directing optical member passes therethrough any other beam from the object than the distance measuring beam without hindrance.

Of course, in this case, the malfunctioning of focusing operation due to the aforementioned ghost light may be avoided by providing the light-emitting means and the light-receiving means at positions asymmetric with respect to the optical axis of the optical system.

Further, the light-directing optical member is provided with a reflecting surface for selectively reflecting the distance measuring beam, whereby the distance measuring beam projected from outside of the light path of the optical system may be directed into the light path and the distance measuring beam in the light path of the optical system may be directed to outside of the light path.

For example, where the optical system according to the present invention is a phototaking optical system such as a zoom lens, a parallel flat-surfaced glass block having its surfaces set so as to be perpendicular to the optical axis of the optical system is disposed as the light-directing member in the optical system more adjacent to the image side than the focusing lens group thereof. In spite of the fact that the phototaking beam passes through the glass block without hindrance, the distance measuring beam from the light-emitting means arrives at the phototaking light path of the phototaking optical system after being subjected to one or more total reflections by the parallel flat surfaces of the glass block, and is reflected in said optical path by the reflecting surface provided in the glass block, whereafter it emerges from the glass block and passes through the focusing lens group for projection onto the object. The distance measuring beam reflected by the object passes through the focusing lens group, is reflected in the phototaking light path and by the reflecting surface provided in the glass block, is totally reflected by the parallel flat surfaces of the glass block, is directed to outside of the phototaking light path, and is detected by light-receiving means provided at a position outside of the phototaking light path and asymmetric with the light-emitting means with respect to the optical axis of the optical system.

The light-emitting means and light-receiving means are disposed at positions conjugate with the prearranged imaging plane of the partial optical system of the phototaking optical system provided more adjacent to the object side than the glass block and outside of the phototaking optical system, the distance measuring beam is projected from the light-emitting means onto an object through the glass block and a part of the phototaking optical system, the reflected light from the object is directed to the light-receiving means through a part of the phototaking optical system and the glass block, and the position of the object with respect to the optical system is detected by the then output of the photoelectric light receptor.

By using a light-directing optical member utilizing total reflection as in the optical system of the present invention, the light-directing optical member can be made thin and further, by this effect, where the same angle of view is to be obtained, the diameter of the forward lens can be made smaller than in the conventional optical system and this leads to the provision of an optical system which is compact as a whole.

By disposing the light-emitting means and light-receiving means at positions asymmetric with respect to the optical axis of the optical system, ghost or flare other than the information beam which enters the light- 1(*a*), (*b*) and (*c*) will now be explained. Assuming that the position I of the imaging lens 1 in FIG. 1(*b*) is the then in-focus condition with respect to the object plane 5, in the position II shown in FIG. 1(*a*) which is the far focus condition, the imaging lens 1 lies rearwardly of the position I of FIG. 1(*b*) and in such condition, the spot image projected onto the object plane 5 is formed in a blurred condition on the object plane and away from the center thereof. In FIG. 1(*a*), II' designates a position whereat the spot image on the object plane 5 is formed most sharply by the then imaging lens 1. The light beam entering so that it is imaged most sharply at the position II' is reflected by the reflecting surface 4*b* of the prism 4 and is imaged on the light-receiving surface of the photosensor array device 3 again in a blurred condition with the central portion thereof deviated from the center C toward the side A. Also, in a position III shown in FIG. 1(*c*) which is the near focus condition, the imaging lens 1 lies forwardly of the position I of FIG. 1(*b*) and again in such condition, the spot image projected onto the object plane 5 is formed in a blurred condition on the object plane 5 and away from the center thereof. In FIG. 3(*c*), III' designates a position whereat the spot image on the object plane 5 is formed most sharply by the then imaging lens 1. The light beam entering so that it is imaged most sharply at the position III' is reflected by the reflecting surface 4*b* of the prism 4 and is imaged on the light receiving surface of the photosensor array device 3 again in a blurred condition with the central portion thereof deviated from the center C toward the side B. In FIG. 1(*b*), I' designates a position whereat the spot image on the then object plane 5 is formed most sharply by the imaging lens 1 which is in in-focus condition, and the light beam entering so that it is imaged most sharply at this position I' is reflected by the reflecting surface 4*b* of the prism 4 and is imaged on the light-receiving surface of the photosensor array device 3 most sharply with the central portion thereof substantially coincident with the center C. In FIGS. 1(*a*), (*b*) and (*c*), the distributions of intensity of light of the spot images on the object plane 5 and on the light-receiving surface of the photosensor array device 3 are schematically indicated by dotted lines. By the imaginary openings for beam projection and light reception being thus localized on the principal plane of the imaging lens 1, the spot images formed at the conjugate point in the in-focus condition of the imaging lens 1 shown in FIG. 1(*b*) are deviated from each other in opposite directions while being blurred correspondingly to the adjusted condition (far focus or near focus condition) of the imaging lens 1 shown in FIGS. 1(*a*) and (*c*) and accordingly, by utilizing the output of the photosensor array device 3 to detect the position of the spot image, namely, the reflected light beam from the object plane, on the light-receiving surface of the photosensor array device 3 (particularly the relative positional relation thereof with the center C), in-focus, near focus and far focus conditions can be discriminated. In the figures, arrow R0 indicates the direction in which the output of the sensor device is read out.

Reference is now had to FIG. 2 to describe an example of the detection of the incidence position of the reflected light beam applicable to the TTL type active focus detecting device as described in FIG. 1. FIG. 2(*a*) schematically shows the energy distribution of the received light beam on the sensor surface of the photosensor array device 3. In FIG. 2(*a*), $E_1$ shows the distribution of the in-focus condition which corresponds to the most sharply imaged condition of FIG. 1(*b*). A point which provides a reference in the detection of the incidence position of the light beam on the sensor surface of the photosensor array device 3 is selected to a point C which is conjugate with the center of the light source 2, and this conjugate point C is preselected at the boundary between the jth sensor element and the j+1th sensor element. Accordingly, in in-focus condition, the energy distribution on the sensor surface is substantially bisected into left and right with the conjugate point C as the boundary as indicated by $E_1$ and, in this condition, the total quantity of energy entering the ith to the jth sensor elements on the sensor surface of the photo-sensor array device 3 and the total quantity of energy entering the j+1th to the kth sensor elements $(j-i = k-(j+1))$ are equivalent to each other within the range of a predetermined error.

Energy distribution conditions $E_2$ and $E_3$ respectively show the imaged conditions on the sensor surface of the photosensor array device in the conditions of FIGS. 1(*a*) and (*c*), namely, the far focus condition and the near focus condition. The energy distribution becomes deviated while being blurred to the left (side B) or to the right (side A) on the sensor surface of the photosensor array device 3 as the imaging lens 1 moves back and forth from its in-focus position I. Accordingly, the maximum amount of movement of the imaging lens 1 and the maximum amount of deviation of the spot image on the sensor surface are in a corresponding relation and from this, the sensor length of the photosensor array device 3, namely, the number of sensor elements, is determined. In this case, even if the sensor length is not large and accordingly, the maximum amount of deviation of the spot image cannot completely be covered but the energy distributions $E_2$ and $E_3$ corresponding to near focus and far focus are the most blurred (namely, expanded) with the distribution at the left end of the right end thereof being out, the practical influence will be minor. In FIG. 2(*a*), the boundaries of the sensor elements corresponding to these left and right ends are defined as i and k. In this example of the light beam incidence position detection, of the signals of the sensor elements delivered from the photosensor array device 3 in time-series fashion, the signals corresponding to i to k are successively integrated and the signals corresponding to i to j and corresponding to j+1 to k are integrated while being inverted in polarity between j and j+1. That is, if the signal corresponding to the energy distribution is V(*t*) and when the gain of the integrator is K, the integrated value S is expressed by the following equation (1).

$$S = K \left( \int_{ti}^{tj} V(t)dt - \int_{tj}^{tk} V(t)dt \right) \quad (1)$$

where K is a constant determined by the gain or the like of the integrating circuit. FIG. 2(*b*) schematically shows a signal V(*t*) inverted in polarity at time $t_j$. FIG. 2(*c*) schematically shows signals obtained when the signals of FIG. 2(*b*) are integrated, with respect to the condition of each energy distribution, namely, the energy distributions $E_1$, $E_2$ and $E_3$ in each focused condition. As the result of the inversion and integration effected at time $t_j$, as can be seen from equation (1), the difference S between the integrated value of the time section from time $t_i$ to time $t_j$ and the integrated value of the time section from time $t_j$ to time $t_k$ is put out with the receiving means is effectively eliminated. In other words, and supposing a plane orthogonal to the optical axis of the optical system at an arbitrary position more adjacent to the object side than the light-directing optical member, the center position of the distance measuring beam on said plane which is emitted from the light-emitting means and the center position of the distance measuring beam which is reflected by the object and travels toward the light-directing optical member are set so as not to satisfy the point-symmetry with respect to the optical axis of the optical system, whereby flare and ghost are effectively eliminated.

Other objects and features of the present invention will become apparent from the following detailed description taken in conjunction with the accompanying drawings.

BRIEF DESCRIPTION OF THE DRAWINGS

FIG. 12 shows the optical arrangement and construction of an embodiment of the present invention, FIG. 12(a) showing the imaging lens system as seen from the front thereof, FIG. 12(b) showing the same lens system as seen from a side thereof, and FIG. 12(c) showing the arrangement relation of the beam-projecting and the light-receiving system as seen from thereabove.

DESCRIPTION OF THE PREFERRED EMBODIMENTS

The present invention will hereinafter be described with respect to some embodiments, but before that, an example of the TTL type active focus detecting device as an application of the present invention will be described with reference to the drawings.

Figure 1A:
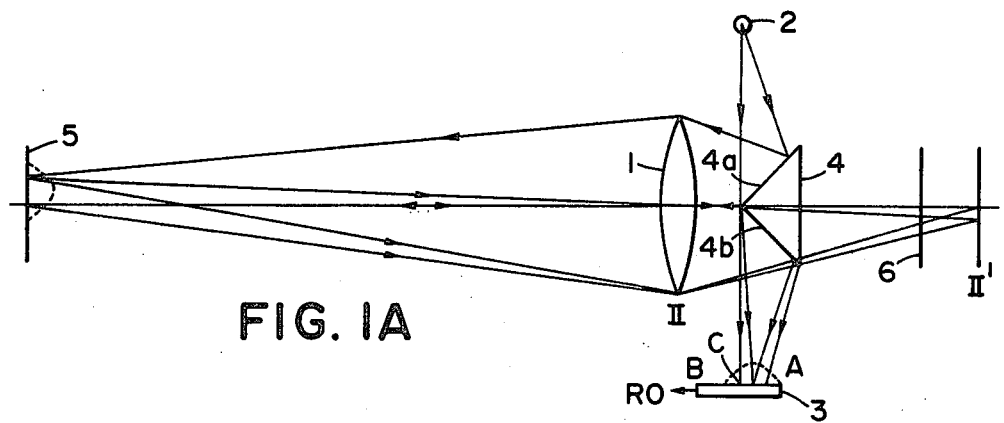
FIG. 1 schematically illustrates the optical arrangement of a TTL type active focus detecting device as an application of the present invention, FIG. 1(a) showing far-focus condition, FIG. 1(b) showing in-focus condition, and FIG. 1(c) showing near-focus condition.
Figure 1B:
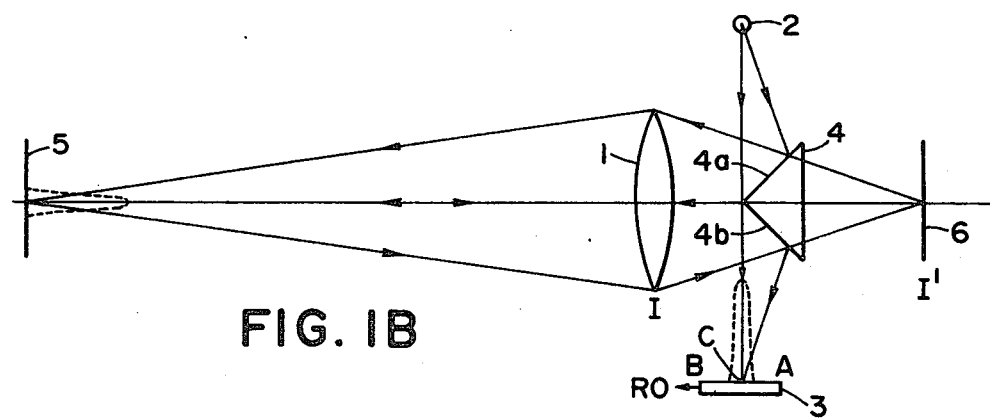
Figure 1C:
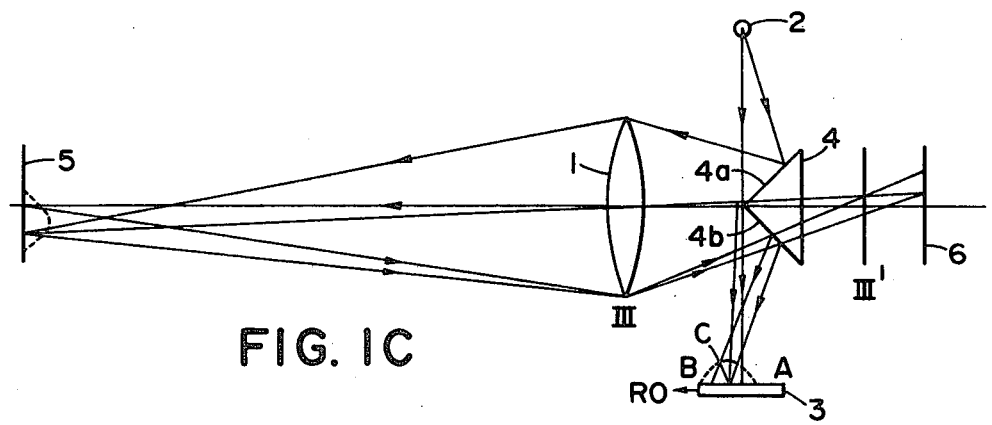

Referring first to FIG. 1 which particularly shows the optical arrangement of the TTL type active focus detecting device as an application of the present invention and disclosed in Japanese Patent application No. 64747/1978, now U.S. Pat. No. 4,357,085 reference numeral 1 designates an imaging lens, reference numeral 6 denotes the prearranged focal plane thereof (which, in a camera, corresponds to the film surface), reference numeral 5 designates an object plane, reference numeral 2 denotes a light source comprising a light-emitting element such as LED or semiconductor laser diode emitting near infrared light or infrared light which constitutes a projection means, reference numeral 3 designates a CCD, BBD, MOS photodiode array comprising, for example, a plurality of photosensors arranged in a line-like form as the scanning type image pickup elements applied as photoelectric light-receiving means, or a self-scanning type photosensor array device (self-scanning type solid state image pickup element) such as CCD photodiode, and reference numeral 4 denotes a prism having reflecting surfaces 4a and 4b.

Figure 2A:
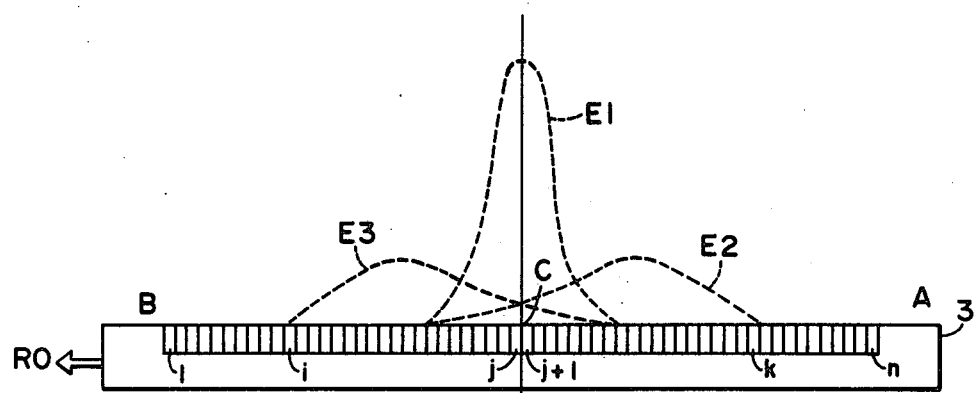
FIG. 2 illustates an example of the detection of the incidence position of a reflected beam applicable to the focus detecting device as illustrated in FIG. 1, FIG. 2(a) showing the distribution condition of the light energy on the sensor surface of a photosensor array device which corresponds to the conditions of FIGS. 1(a), (b) and (c), FIG. 2(b) showing the timing relation of the inverted integration of the sensor device output, and FIG. 2(c) showing the manner of the inverted integration.
Figure 2B:
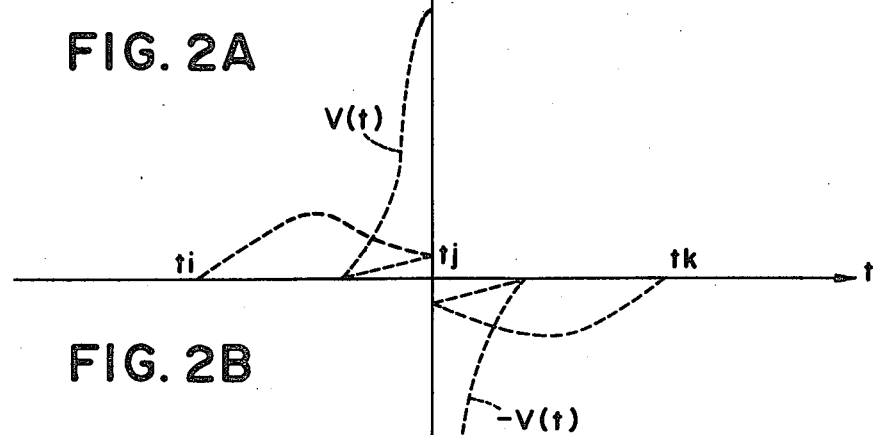
Figure 2C:
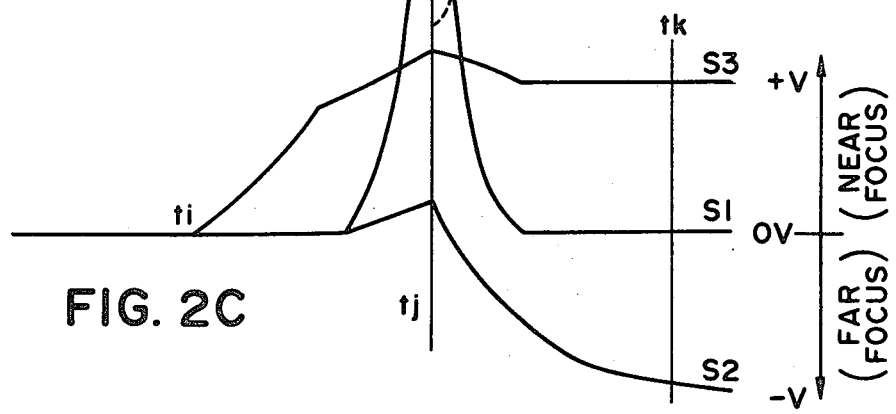
Figure 3:
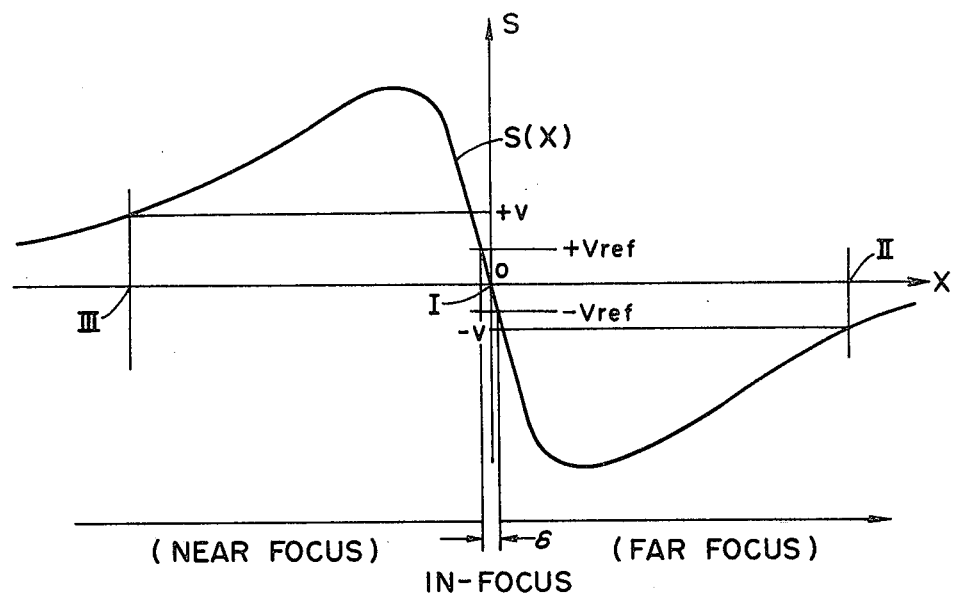
FIG. 3 is an output waveform diagram showing the manner of variation in an output signal S obtained by way of the inverted integration illustrated in FIG. 2 and which corresponds to the variation in incidence position of the beam.

In such an arrangement, the light beam emitted from the light source 2 is reflected by the reflecting surface 4a of the prism 4, and passes through an area of the imaging lens 1 which corresponds to the reflecting surface 4a, namely, the imaginary opening on the principal plane thereof, whereafter the spot image of the light source 2 is projected onto the object plane 5. The light source 2 is disposed in conjugate relationship with a predetermined location on the prearranged focal plane 6. The arrangement in such conjugate relationship also holds true of the photosensor array device 3. Thus, the light-emitting center of the light source 2 and the center C of the light-receiving surface of the photosensor array device 3 are set up in mutually conjugate relationship. On the other hand, of the light beam reflected by the object plane 5 and entering the imaging lens 1, the light beam passing through another area of the imaging lens which corresponds to the reflecting surface 4b of the prism 4, namely, another imaginary opening on the principal plane thereof, projects the spot image of the light source 2 onto the light-receiving surface of the photosensor array device 3. Differences between FIGS.

lapse of time $t_k$. When this difference S is zero as indicated by $S_1$ in FIG. 2(c), there is brought about a condition in which the imaging has been made so that the energy distribution is equal on the left and right with the conjugate point C set on the sensor surface of the photosensor array device 3 as the center, and in FIG. 1, it corresponds to the in-focus condition (b) and in FIG. 2(a), it corresponds to the condition of energy distribution $E_1$. Also, $S_2$ and $S_3$ in FIG. 2(c) correspond to the energy distributions $E_2$ and $E_3$ on the sensor surface of the photo-sensor array device 3 which are shown in FIG. 2(a). That is, as regards $S_2$, the difference between the integrated signal envelope corresponding to the energy distribution on the sensor elements i to j and the integrated signal envelope corresponding to the energy distribution on the sensor elements j+1 to k is put out as $-V$ as shown at the right end of curve $S_2$ in FIG. 2(c), with lapse of time $t_k$, as the result of the inversion and integration at time $t_j$. In this manner, in accordance with the degree of the axial deviation of the imaging lens 1 from the in-focus position of the imaging lens 1 corresponding to a certain object, the signal light energy distribution on the sensor surface of the photosensor array device 3 moves to left and right with the conjugate point C as the center while being accompanied by blur, and the variation in the level of the integrated output shown in FIG. 2(c) which corresponds to such lens movement, immediately after the lapse of time $t_k$, namely, the level of the output S after the inversion and integration represented by equation (1), becomes such a curve as shown in FIG. 3. This schematically represents the curve $S=S(X)$ with the value of S represented by equation (1) being as the vertical axis (referred to as the S-axis) and with the amount of deviation of the imaging lens 1 from the in-focus position as the horizontal axis (referred to as the X-axis). At the point whereat the curve $S(X)$ intersects the X-axis, namely, when $S(X)=0$, there is brought about in-focus condition. The curve $S(X)$ is substantially symmetrical about the origin and therefore, by seeking after the polarity of $S(X)$ and the position X of the imaging lens 1 whereat $S(X)=0$, in-focus, near focus and far focus can be discriminated from one another. For example, II, I and III in FIG. 3 respectively correspond to the imaging lens positions II, I and III in FIGS. 1(a), (b) and (c), and the value of each $S(X)$ corresponds to the amount of deviation.

Now, in the construction of the beam-projecting and light-receiving system of such a TTL type active focus detecting device, the light source 2 and the photosensor array device 3 are disposed at positions conjugate with a predetermined location on the prearranged focal plane 6 of the imaging lens 1 and therefore, when the light from the light source 2 is projected toward the object plane 5 through a part area of the imaging lens 1 and via the reflecting surface 4a of the prism 4, part of the light reflected by the inner surface of the imaging lens may sometimes enter the photosensor array device 3, as already described.

FIGS. 4-11 illustrate examples in which such light rays reflected by the inner surface of the lens have been traced by a computer. In these figures, an arbitrary point on the light ray IL incident on the lens L is X and an arbitrary point on the light ray OL emergent from the lens L is Y. The point of intersection between the extension of the incident light ray IL and the optical axis O of the lens corresponds to the light-emitting point of the light source 2. The surfaces of the lens L are designated by a, b, c and d, and the points on the respective surfaces of the lens L through which the light rays are transmitted and reflected are designated by A, B, C, D, . . . .

Figure 4:
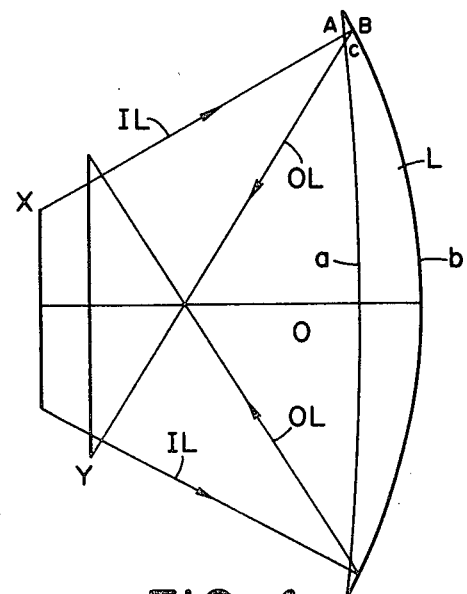
FIGS. 4, 5, 6, 7, 8, 9, 10 and 11 are schematic diagrams showing eight examples in which the phenomenon of inner surface reflection of an imaging lens has been traced by a computer.

First, FIG. 4 shows the manner in which the light ray IL incident on the point A on the surface a of the lens L is reflected at the point B on the surface b of the lens and emerges from the point C on the surface a. In this example, the reflection by the inner surface of the lens L occurs only once at the point B. Accordingly, assuming that the reflection factor of each surface of the lens L is 0.5%-1%, the energy of the light incident on the point Y is about 1/200 to about 1/100 of that at the point X.

Figure 5:
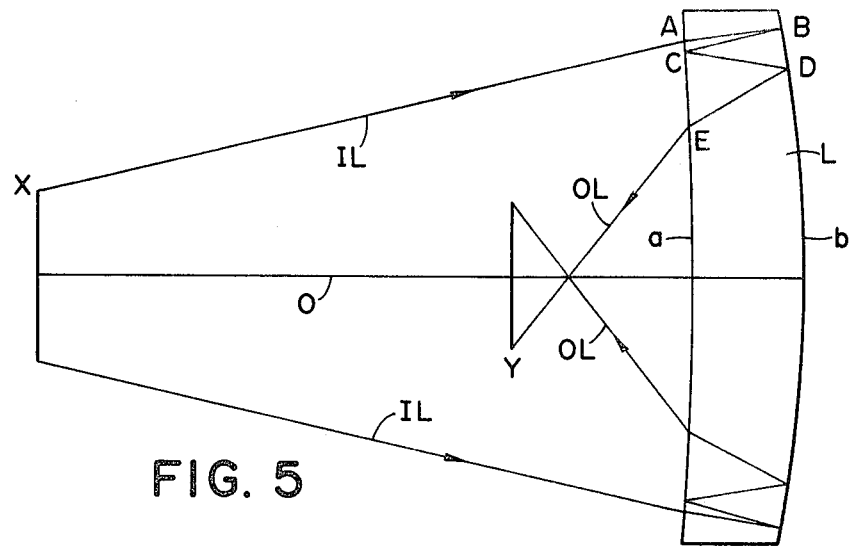

FIG. 5 shows a case where the reflection by the lens surface occurs three times, i.e., at the points B, C and D. Accordingly, the energy of the light incident on the point Y is about $(1/200)^3$ to about $(1/100)^3$.

Figure 6:
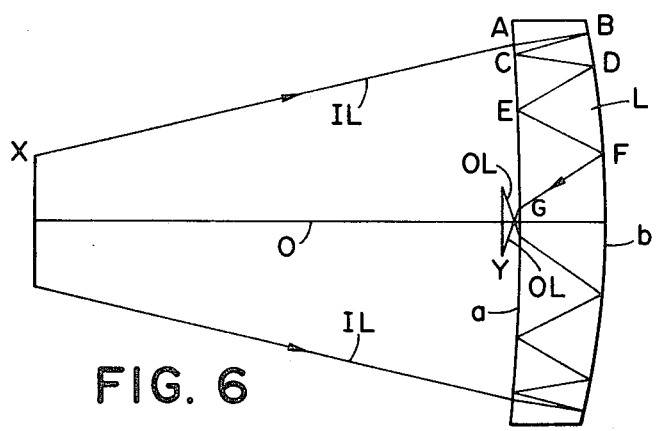
Figure 7:
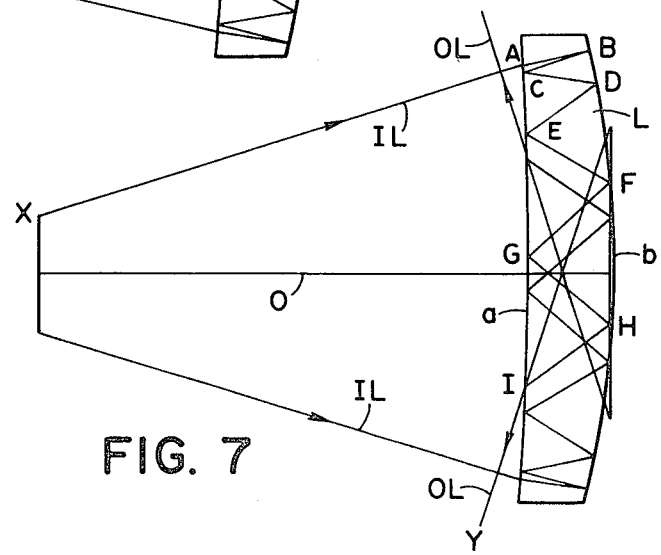

Likewise, FIGS. 6 and 7 respectively show a case where the reflection occurs five times and a case where the reflection occurs seven times. In these cases, the energy of the light incident on the point Y is $(1/200)^5$ to $(1/100)^5$ and $(1/200)^7$ to $(1/100)^7$, respectively.

Figure 8:
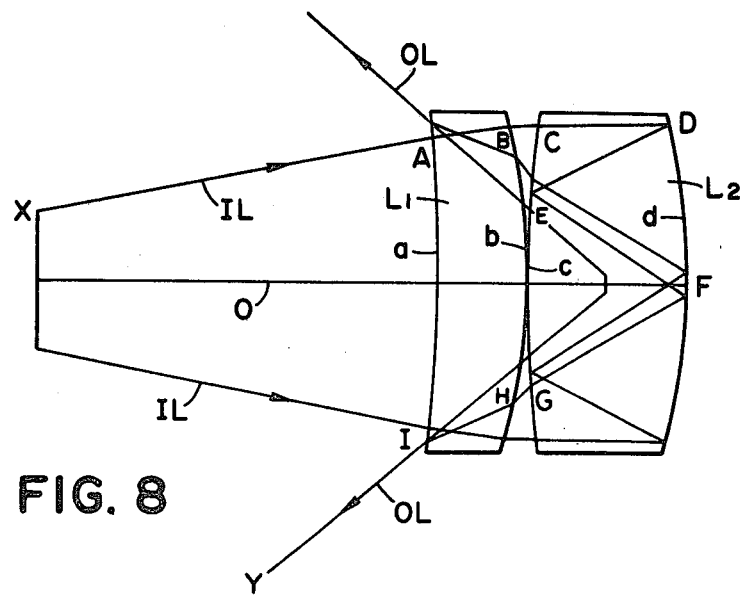
Figure 9:
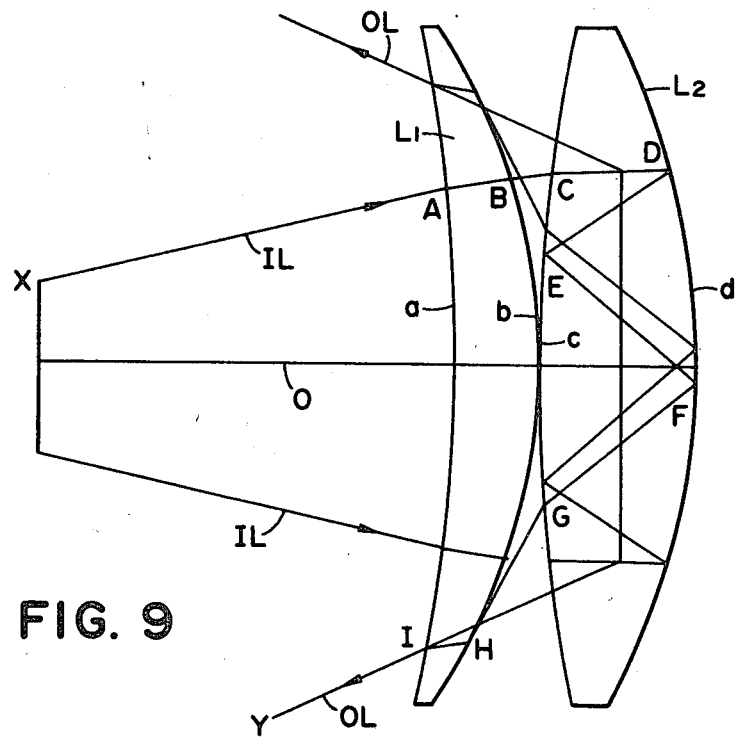
Figure 10:
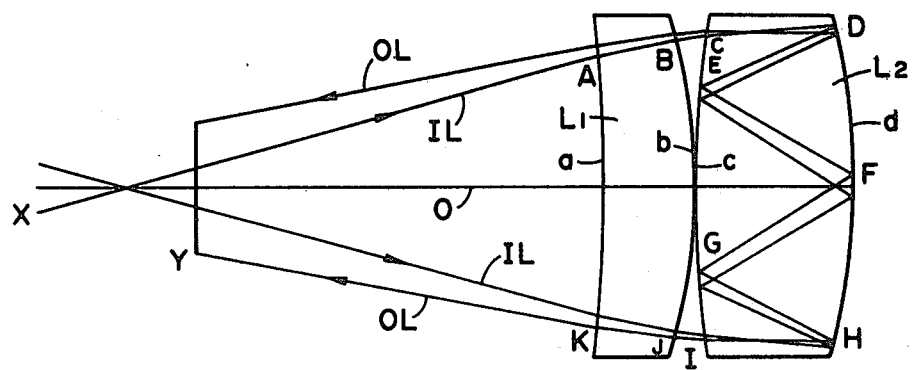
Figure 11:
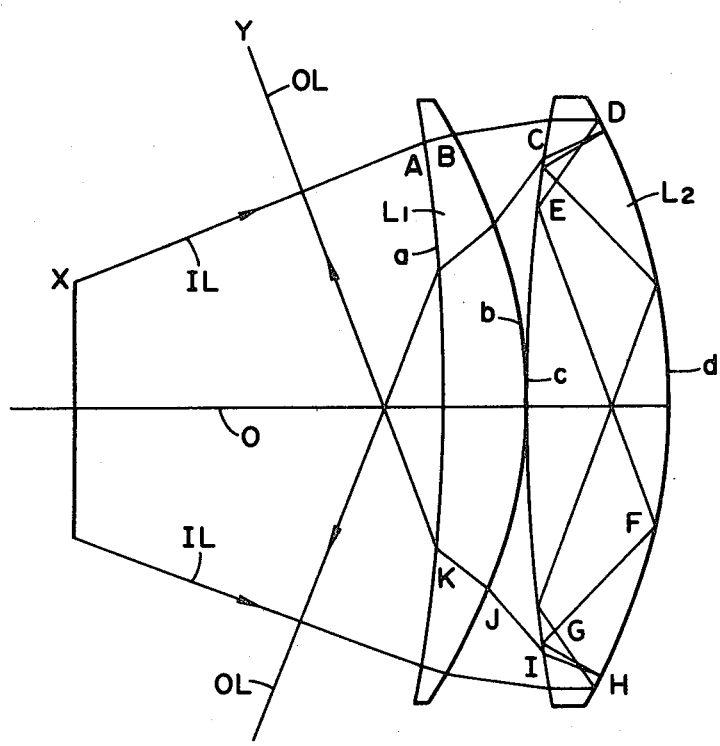

FIGS. 8-11 refer to cases where two lenses $L_1$ and $L_2$ are used, FIGS. 8 and 9 showing examples in which the reflection occurs three times, and FIGS. 10 and 11 showing examples in which the reflection occurs five times.

The light returned by such reflection by the inner surface of the lens, if it enters the photosensor array device 3 while being superposed on the signal light beam to be detected by the photosensor array device 3, will provide ghost or flare having a serious adverse effect and, as already described, for example, where a light beam having an energy intensity of about 1 mW is projected from the light source 2, and assuming that all of the light beam after reflected five times by the inner surface of the lens has entered the photosensor array device 3, the then energy intensity of such incident light is about $0.5 \times 10^{-13}$ W to about $1 \times 10^{-13}$ W and will be an significant detrimental light particularly to photoelectric light-receiving means having a so-called accumulation effect, such as a photosensor array device.

The improvements according to the present invention which can well avoid such problems will now be described with respect to some specific embodiments.

FIG. 12 illustrates the manner of setting of the beam-projecting imaginary opening and the light-receiving imaginary opening, for example, on the principal plane of the improved imaging optical system according to the present invention, FIG. 12(a) showing the imaging optical system as seen from the front thereof, FIG. 12(b) showing such optical system as seen from a side thereof, and FIG. 12(c) showing the arrangement relation of the beam-projecting system and the light-receiving system as seen from thereabove.

In these figures, reference numeral 11 schematically designates an imaging lens system, and reference numeral 12 denotes the prearranged imaging plane thereof. The imaging lens system is movable back and forth along the optical axis O thereof and relative to an object. Reference numerals 13 and 14 respectively designate a light-emitting device forming a beam-projecting means and the light-projectin lens thereof. A position P′ conjugate with a predetermined position P on the prearranged imaging plane 12 (in the present example, the point of intersection with the optical axis O) is set so as to be conjugate with the light-emitting point of the light-emitting device 13 by the beam-projecting lens 14. Designated by 12′ is a plane conjugate with the prearranged imaging plane 12. Reference numerals 15 and 16 respectively denote a photosensor array device as photo-electric light-receiving means and the light-receiving lens thereof. The light-receiving lens 16 is provided to condense a light beam incident on the position P' onto the sensor surface of the photosensor array device 15. The projecting light beam from the light-emitting device 13 more condensed by the beam-projecting lens 14 is projected toward an object via a total reflection mirror 19 and a semi-reflection mirror 20 and through a part area of the imaging lens system 11 and is reflected by the surface of the object, whereafter the reflected light beam is incident on the imaging lens system 11, the light beam taken out by the semi-reflection mirror 20 and the total reflection mirror 19, namely, the light beam passing through another part area of the imaging lens system 11, is further condensed by the light-receiving lens 16 and enters the photosensor array device 15.

In the present example, the beam-projecting imaginary opening is adapted to be defined by the beam-projecting lens 14 and the light-receiving imaginary opening is likewise adapted to be defined by the light-receiving lens 16. That is, in FIG. 12(a), a circle PA and a circle RA are the beam-projecting and light-receiving imaginary openings on an arbitrary cross-section 11' (for example, the principal plane) of the imaging lens system 11, and a and b are the centers thereof, namely, the positions of the points of intersection of the optical axes $O_1$ and $O_2$ of the beam-projecting and light-receiving lenses 14 and 16 with the arbitrary cross-section 11'. The movement of the center of gravity of the light beam on the sensor surface of the photosensor array device 15 resulting from the adjustment of the focus of the imaging lens system 11 is set so that it takes place substantially parallel to the segment passing through the points of intersection a and b, that is, so that where the light-emitting device 13 and the photosensor array device 15 are positioned on the prearranged imaging plane 12 in an optically equivalent condition, the light-emitting point and the center C (shown in FIG. 2) of the photosensor array device 15 are coincident with the position P and the direction of the sensor array is substantially parallel to the segment passing through the points a and b. However, the direction of the sensor array need not be spatially parallel to the segment passing through the points a and b, but may be substantially parallel thereto at a practical standpoint in a condition in which it has been projected upon the prearranged imaging plane 12.

A method of setting the beam-projecting and light-receiving imaginary openings will now be described in particular. First, it is clear from the fact that the lens surface of the imaging lens system 11 is a point-symmetric curved surface centered at a predetermined point on the optical axis O and that the light-emitting point of the light-emitting device 13 is set at a position conjugate with the position P, that, of the light beam emitted from the ight-emitting device 13 and then entering the imaging lens system 11 via the beam-projecting lens 14 and mirrors 19, 20, the light ray emerging by the inner surface reflection at an arbitrary point in an arbitrary lens surface of the imaging lens system 11 lies in a plane containing said arbitrary point and the optical axis O. Accordingly, the inner surface reflected light ray in an arbitrary lens surface of the imaging lens system 11 shown in FIG. 12(a) emerges only from the portion indicated by hatching and surrounded by two tangential lines on the beam-projecting imaginary opening shown by the circle PA, which tangential lines pass through the point of intersection LC between the arbitrary cross-section 11' of the imaging lens system 11 and the optical axis O thereof. Accordingly, by installing the beam-projecting and light-receiving systems such that the light-receiving imaginary opening RA is set in a portion other than this area of hatching, namely, such that basically, the beam-projecting optical axis $O_1$ defined by the beam-projecting lens 14 and the light-receiving optical axis $O_2$ defined by the light-receiving lens 16 are set so that the points of intersection a and b between these optical axes $O_1$, $O_2$ and the arbitrary cross-section 11' of the imaging lens system 11 do not satisfy a point-symmetric relation on the arbitrary cross-section 11' with respect to the point of intersection LC between the arbitrary cross-section 11' and the optical axis O of the imaging lens system, the ghost or flare by the inner lens surface reflection as described in connection with FIGS. 4–11 may be completely eliminated. Incidentally, in the example shown in FIG. 12, the beam-projecting and light-receiving imaginary openings PA and RA are set such that they do not satisfy a point-symmetric relation with respect to the point of intersection LC but satisfy a substantially point-symmetric relation with respect to a vertical segment l orthogonal to the optical axis O. In FIG. 12(c), reference numerals 17 and 18 designate light-intercepting covers for intercepting any light ray which may enter from other than the light-receiving imaging opening RA.

Figure 13A:
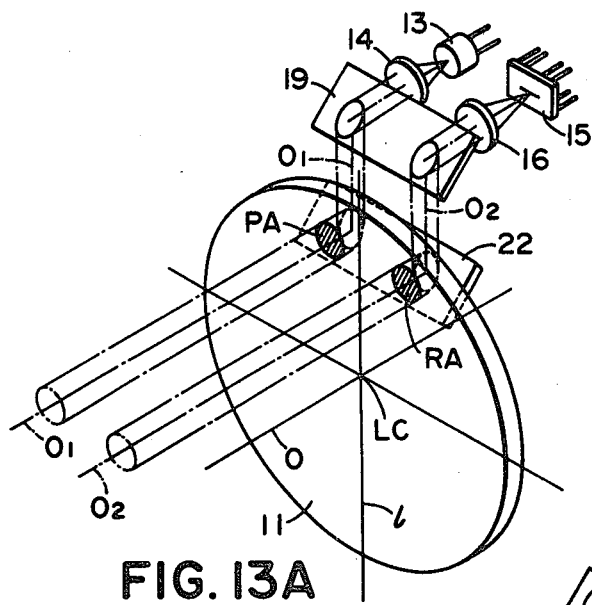
FIGS. 13(a), (b) and (c) are perspective views showing three other specific examples of the beam-projecting and the light-receiving system.
Figure 13B:
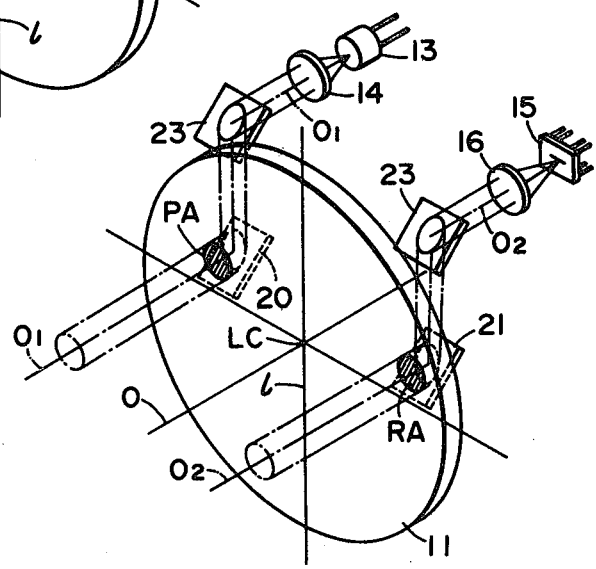
Figure 13C:
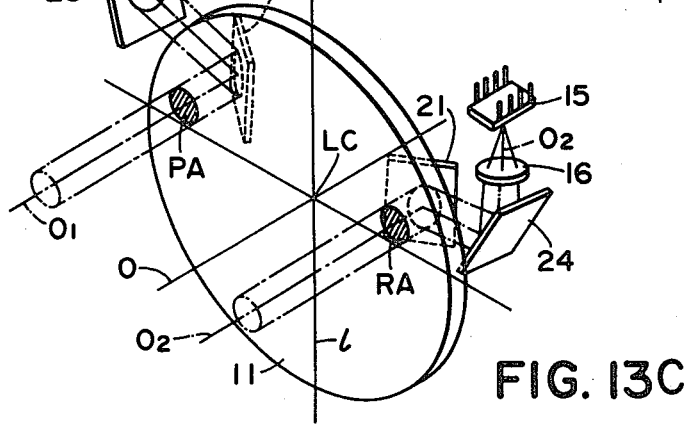

FIG. 13 shows further specific examples of the construction of the beam-projecting and light-receiving systems. In the example shown in FIG. 12, the beam-projecting and light-receiving imaginary openings PA and RA are set so as to satisfy a substantially line-symmetric relation with respect to the vertical segment l orthogonal to the optical axis O, whereas in the examples shown in FIG. 13, the imaginary openings are set so as not to satisfy even the line-symmetry with respect to such vertical segment l. That is, in the example shown in FIG. 13(a), the imaginary openings PA and RA are set by utilizing one half area (in the figure, the right half area) of the imaging lens system 11 with the vertical segment l as the boundary so that the light-receiving imaginary opening RA lies on one side of the optical axis O and the beam-projecting imaginary opening PA lies on the other side. In the examples shown in FIGS. 13(b) and (c), the imaginary openings PA and RA are set on the left and right with the vertical segment l as the boundary, but such that in FIG. 13(b) the distance of the light-receiving imaginary opening RA from the optical axis O is greater than the distance of the beam-projecting imaginary opening PA from the optical axis O and that in FIG. 13(c) the latter distance is greater than the former distance. In FIG. 13, reference numeral 22 designates a semi-reflection mirror, reference numerals 23 and 24 denote total reflection mirrors, and elements designated by 11–21 are identical to those described in connection with FIG. 12.

Description will now be made of the improvements of the present invention in an optical system including the above-described light-emitting device and photoelectric ight-receiving device.

Figure 14:
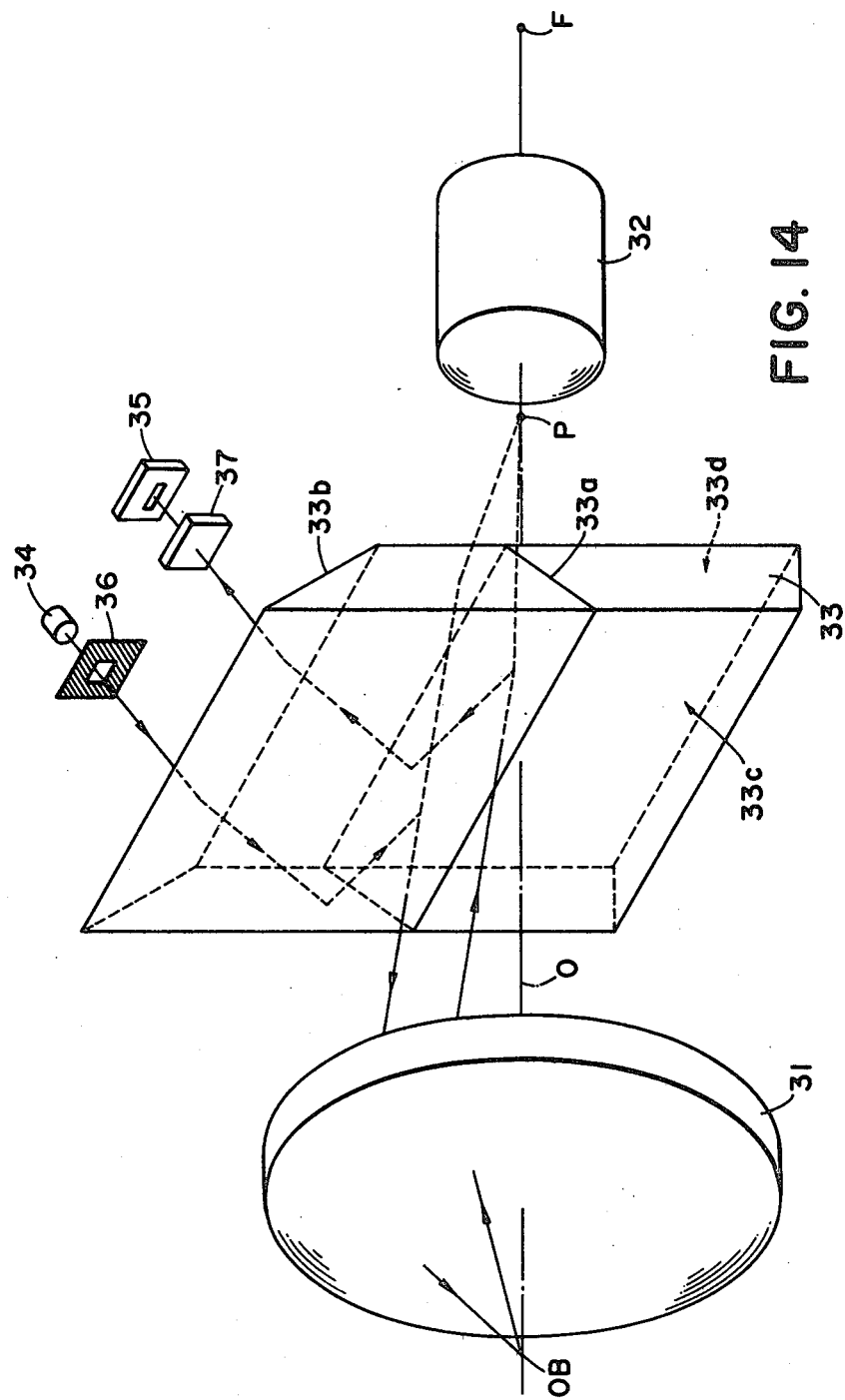
FIG. 14 illustrates the basic construction of the optical system according to the present invention.

In the arrangement shown in FIG. 14, reference numeral 31 designates a lens group including a focusing lens group having a focus adjusting function along the optical axis O, namely, a so-called focusing portion, and P denotes the prearranged imaging plane thereof which provides, in a telephoto lens of the movable forward lens type, an object point for a lens portion 32 provided on the image side or which provides, in a zoom lens system, an object point for a lens system subsequent to the focusing portion, usually, a variator. Designated by 33 is a glass block provided perpendicularly to the optical axis O and having in a portion thereof a half-mirror 33a obliquely disposed at a predetermined angle with respect to the optical axis O. Reference numeral 34 denotes a light-emitting device such as a light-emitting diode, a semiconductor laser or the like. The light beam emitted from the light-emitting device 34 passes through an end surface 33b of the glass block 33 and is totally reflected by a surface 33c or 33d or both of the glass block 33 which is perpendicular to the optical axis O and through which the image pickup light passes, whereafter it is reflected by the half-mirror 33a, and then passes through the surface 33c of the glass block 33 which is perpendicular to the optical axis and which is adjacent to the object side, and is further projected onto an object OB through the focusing lens portion 31. The light-emitting device 34 is provided so that the center thereof is coincident with a position optically conjugate with the prearranged imaging plane P of the focusing lens portion 31. It is desirable that the light beam emitted from the light-emitting device 34 be limited by a mask as shown. Designated by 35 is a photo-electric light-receiving device such as CCD provided at a predetermined position relative to the light-emitting device 34. The reflected light from the object OB passes through the focusing lens portion 31, passes through the surface 33c of the glass block 33 which is pependicular to the optical axis O, and is reflected by the obliquely disposed half-mirror 33a. Further, the light is totally reflected by the surface 33c or 33d perpendicular to the optical axis O or both of these surfaces 33c and 33d, emerges from the glass block 33 through an end surface 33b thereby and enters the photoelectric light-receiving device 35. It is desirable that the light-emitting device 34 emit other wavelength than visible light, because the phototaking light and the distance measuring light commonly use a part of the image pickup optical system. Infrared or near infrared light may be used as the other wavelength range than visible light which passes through ordinary glass. A wavelength selecting filter 37 may desirably be provided so as to intercept visible light immediately before the photoelectric light-receiving device 35 so that the photoelectric light-receiving device 35 responds only to the wavelength emitted from the light-emitting device 34 and so as to pass therethrough only the light emitted from the light-emitting device 34.

The end surface 33b of the glass block 33 has an angle such that the light emitted from the light emitting device 34 enters the glass block 35 substantially perpendicularly thereto and the light reflected by the object OB emerges substantially perpendicularly and then enters the photoelectric light-receiving device 35.

The phototaking light, after having passed through the focusing lens portion 31 and the glass block 33, is imaged on the image plane F of the phototaking lens system constituted by the subsequent lens portion 32.

Also, where the power of the lens portion 31 which is adjacent to the object side is negative or nearly zero, it will ensure efficient beam projection from the light-emitting device 34 onto the object OB and efficient light reception, by the photoelectric light-receiving device 35, of the reflected light from the object OB to install an auxiliary lens between the light-emitting device 34 and the glass block 33 and between the glass blook 33 and the photoelectric light-receiving device 35.

Of course, the focusing lens portion 31 shown in FIG. 14, the lens portion 32 which is adjacent to the image side, and the auxiliary lenses mentioned just above are lens groups constituted by a plurality of lenses for correction of aberrations.

While, in the arrangement shown in FIG. 14, light is totally reflected once by the surface 33c of the glass block 33 which is perpendicular to the optical axis O and emerges from the glass block 33, it is also possible that light is totally reflected twice or more times by the surfaces 33c and 33d of the glass block 33 which are perpendicular to the optical axis O. Further, for example, in the system of FIG. 14, it is also possible that a mirror for reflecting the distance measuring wavelength of light is provided between the end surface 33b and the photoelectric light-receiving device 35 or/and between the end surface 33b and the light-emitting device 34 and the positions whereat the photoelectric light-receiving device and the light-emitting device are installed are suitably changed.

Figure 15:
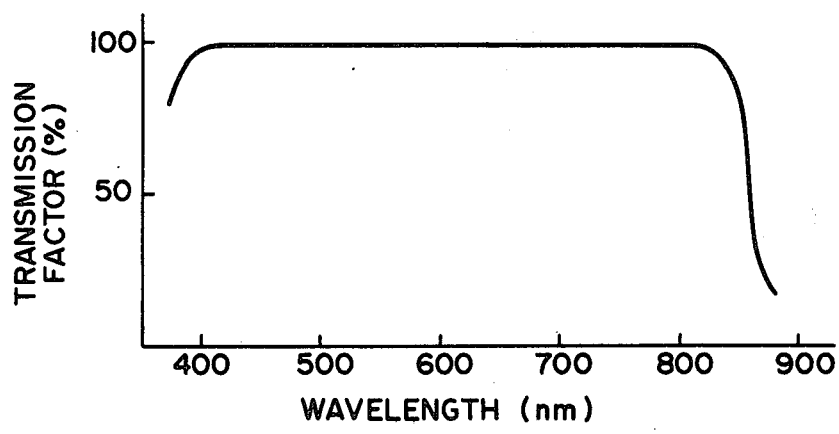
FIG. 15 is a graph showing the spectral transmission factor of an embodiment of a reflection preventing film provided in a lens group having a focusing portion in the optical system according to the present invention.

Also, as previously described, the surfaces of the glass block 33 which are perpendicular to the optical axis 0 and the lens portion 31 which is adjacent to the object side are used in common for both phototaking visible light and distance measuring near infrared light and therefore, the characteristic of the reflection preventing film provided on the air-contacting surface of the component thereof acts effectively not only for visible light of about 400 to 700 nm in wavelength but also for the wavelength of about 800 nm, as shown in FIG. 15.

Figure 16:
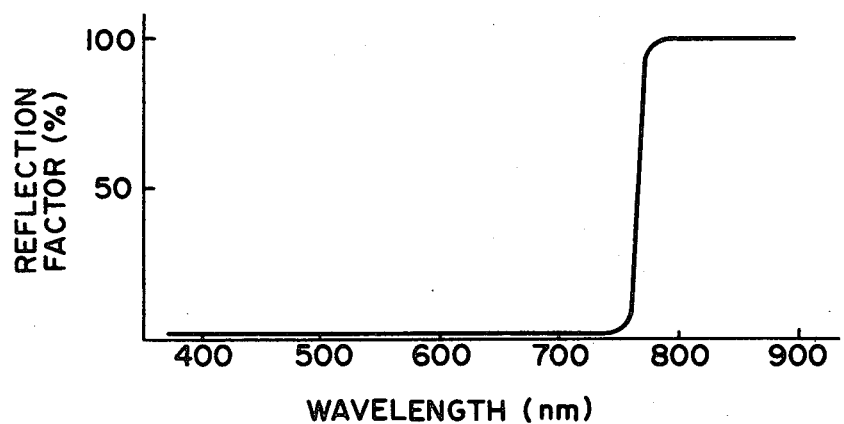
FIG. 16 is a graph showing the spectral reflection factor of an embodiment of a half-mirror provided in the glass block of the optical system according to the present invention.

As regards the half-mirror 33a disposed within the glass block 33 at a suitable angle with respect to the optical axis 0, the glass block 33 having such half-mirror 33a has a spectral characteristic that it acts on visible phototaking light in no way but passes therethrough all of such light and reflects only distance measuring infrared or near infrared light, and the wavelength characteristic curve thereof is shown in FIG. 16.

The configuration of the glass block for passing therethrough phototaking light and taking out only distance measuring light outside of the phototaking lens system will hereinafter be described in detail in contrast to the well-known technique.

Figure 17:
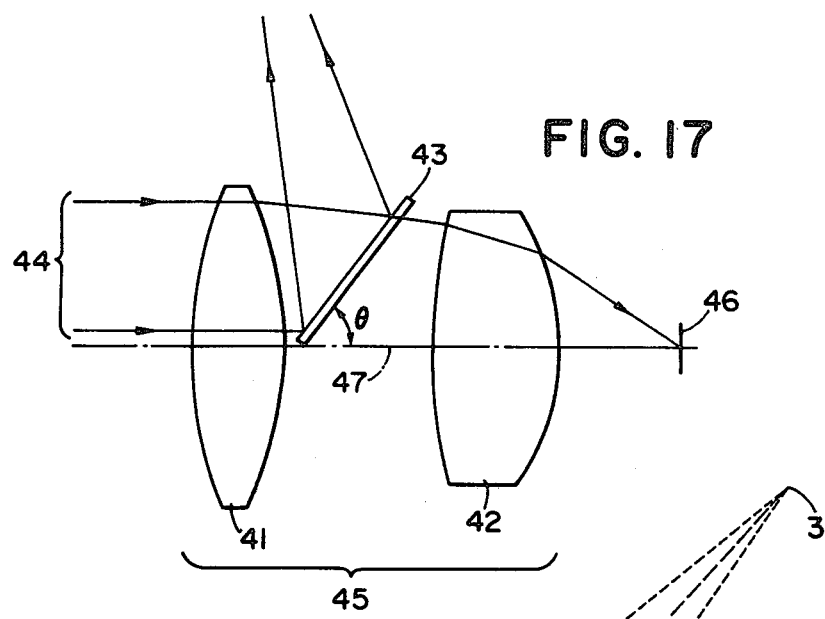
FIG. 17 illustrates a method of taking out a distance measuring beam by a well-known technique.

The well-known technique whereby a half-mirror 43 is provided between a focusing lens portion 41 and a subsequent lens portion 42 disposed adjacent to the image plane side as shown in FIG. 17 will first be considered. In order that sufficiently much of the distance measuring light beam 44 may be introduced in view of the distance measuring accuracy, the spacing between the focusing lens portion 41 and the subsequent lens portion 42 must be sufficiently wide. If this is realized, not only the total length of the entire phototaking lens system 45 will become great but also it will become impossible to avoid a greater size of the forward lens having the focusing lens portion in order to secure a sufficient quantity of light for image pickup members such as film, image pickup tube, etc., and thus compactness of the entire system cannot be expected. If a sufficiently large light beam is secured and the angle $\theta$ formed by the half-mirror 43 with the optical axis 47 is selected to a great value, the light rays near the optical axis 47 will impinge on the lens portion 41 provided adjacent to the object side and virtually, the distance measuring light beam will become small. Conversely, if the angle θ formed by the half-mirror 43 with the optical axis 47 is selected to a small value, the above-mentioned disadvantage may be avoided, but in such case, the space in which the mirror 43 is installed will become extensive and this will lead to an increased total length of the system and an increased diameter of the forward lens as noted above.

A construction which can overcome the above-noted disadvantages and which enables a great quantity of light beam to be projected or received in spite of the installation space being small will now be described with respect to the glass block according to the present invention shown in FIG. 14.

Figure 18:
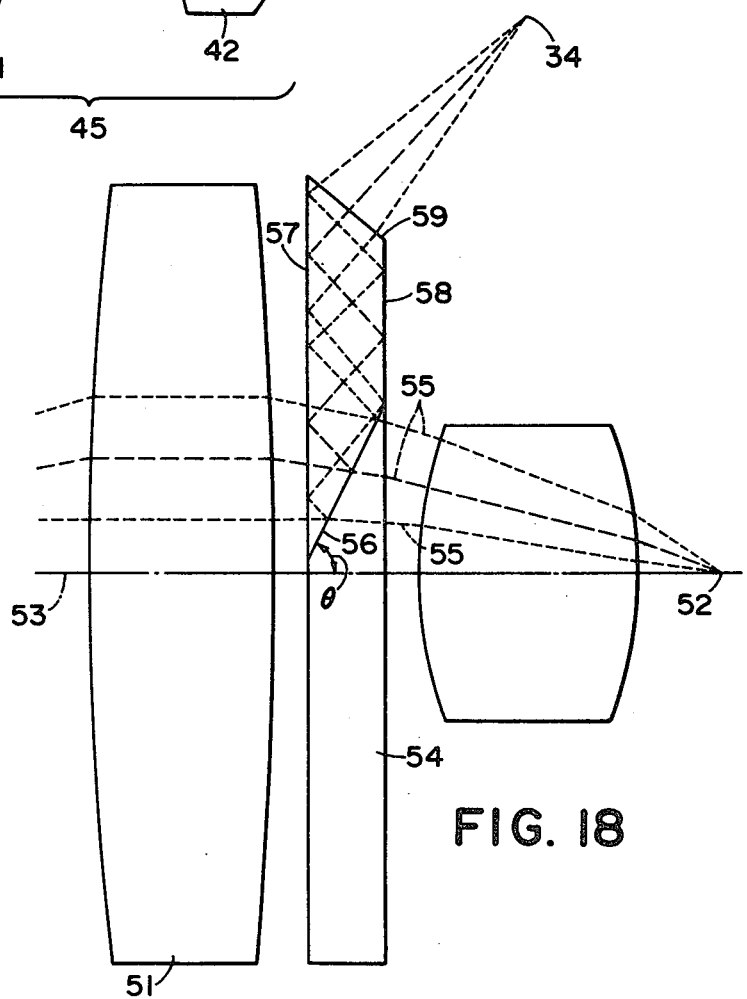
FIG. 18 shows the light path in an embodiment of the glass block applied to the optical system according to the present invention.

FIG. 18 shows a form of the glass block. Reference numeral 51 designates a lens group having an adjusting function with respect to in-focus along the optical axis 53, namely, a so-called focusing function, and reference numeral 52 denotes the imaging point of the entire system. The glass block 54 having surfaces 57 and 58 perpendicular to the optical axis 53 has provided therein a half-mirror 56 forming a predetermined angle θ with respect to the optical axis 53 and passing therethrough phototaking light 55 and reflecting distance measuring infrared or near infrared light. In this form, the light emitted from a light-emitting device 34 passes through an end surface 59 of the glass block 54, whereafter it is totally reflected by a surface 57 of the glass block 54 which is perpendicular to the optical axis 53, and is totally reflected by a further surface 58, and is thereafter reflected by the half-mirror 56 and passes through said surface 57 perpendicular to the optical axis 53. Further, the light passes through the lens group 51 to an object, not shown. The reflected light from the object, conversely from the aforementioned route, passes through the lens group 51 and the surface 57 of the glass block 54, and is reflected by the half-mirror 56, whereafter the light is totally reflected by the surfaces 57 and 58 of the glass block 54 which are perpendicular to the optical axis 53, and then emerges from the end surface 59 of the glass block 54 to reach a photoelectric light-receiving device, not shown. Here, conditions will be shown under which, in the surfaces 57 and 58 of the glass block 54 which are perpendicular to the optical axis 53, the phototaking light reaching the imaging point 52 is transmitted while, on the other hand, the distance measuring light first passes through the surface 57 in the reflection from the object and then is reflected by the half-mirror 56, whereafter it is totally reflected and directed to the outside of the glass block 54.

Figure 19:
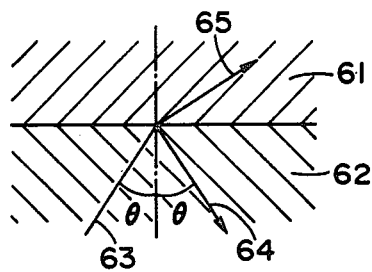
FIG. 19 illustrates total reflection.

Generally, total reflection is a phenomenon that, as shown in FIG. 19, when, in the interface between mediums 61 and 62 of different refractive indices, a light having an angle of incidence θ is caused to enter from the medium of a higher refractive index (here, $n_2 > n_1$), there are usually created a reflected light 64 and a refracted light 65, but if the condition that $$\theta > \sin^{-1}\left(\frac{n_1}{n_2}\right)$$

is satisfied, there is created no refracted light and all the light becomes a reflected light.

Figure 20:
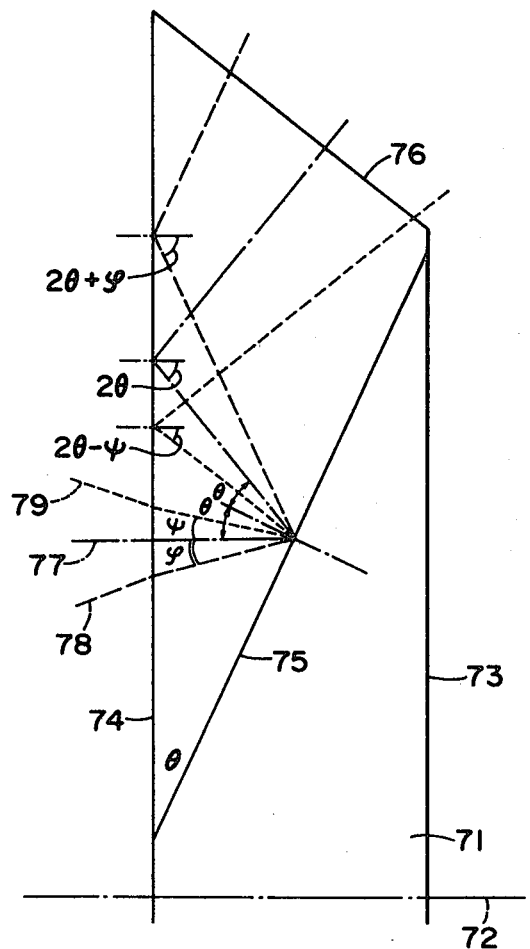
FIG. 20 illustrates the total reflection conditions in the glass block applied to the optical system of the present invention.

FIG. 20 shows the details of a glass block suitable for the present invention. The glass block 71 is comprised of two surfaces 73 and 74 perpendicular to the optical axis 72, a half-mirror 75 having an angle θ with respect to the perpendicular to the optical axis 72, and an end surface 76 for entrance from a light-emitting device, not shown, or for exit to a photoelectric light-receiving device, not shown. The object side is the left-hand side of the figure and the imaging side is the right-hand side.

Generally, light passed through a certain optical system assumes the same light path even if the entrance and the exit are reversed. Therefore, in FIG. 20, only one of the entrance and the exit is shown. Here, directing the reflected light from the object to a photoelectric light-receiving device by the glass block after such reflected light has passed through the focusing lens portion is treated.

First, infrared or near infrared light 77 used for distance measurement which perpendicularly enters the object side end surface 74 of the glass block 71 which is perpendicular to the optical axis is treated. This light, after having entered the end surface 74, is reflected by a half-mirror 75 which passes therethrough visible light only and reflects near infrared or infrared light, whereafter it again arrives at the end surface 74 at an angle of incidence 2θ. This light must not pass through the surface 74 and in order that it may be totally reflected, the following condition $$\theta > \frac{1}{2}\left(\sin^{-1}\frac{1}{n}\right) \tag{a}$$

must be satisfied, where n represents the refractive index of the glass block 71. Also, the distance measuring light beam does not consist of only light rays parallel to the optical axis such as light ray 77, but includes a light 78 which travels away from the optical axis at an angle φ or a light ray 79 which travels toward the optical axis at an angle φ.

In contrast to these, conditions under which total reflection should take place are as follows:

$$\theta > \frac{1}{2}\left(\sin^{-1}\frac{1}{n} - \phi\right) \tag{b}$$

$$\theta > \frac{1}{2}\left(\sin^{-1}\frac{1}{n} + \phi\right) \tag{c}$$

Accordingly, in order that all light rays may pass through the end surface 74 and be reflected by the half-mirror 75 and then be totally reflected again by the end surface 74, it is necessary that all of conditions (a), (b) and (c) be satisfied. That is, the angle θ formed by the half-mirror 75 with the perpendicular to the optical axis may be set so as to satisfy $$\theta > \frac{1}{2}\left(\sin^{-1}\frac{1}{n} + \phi\right)$$

Also, it is desirable that the end surface 76 from which the light beam totally reflected by the end surface 74 emerges be provided so as to pass this light beam substantially perpendicularly.

Although description has been made of a case where total reflection occurs only once on the end surface 74 adjacent to the object side, it will be appreciated that the conditions of the angle θ of the half-mirror 75 with respect to the optical axis 73 are invariable even where the light beam is taken out or sent out by the use of two end surfaces 73 and 74, such as when, as shown in FIG. 18, the light beam is totally reflected by the end surface 57 and thereafter totally reflected by the end surface 58 adjacent to the object side.

As described above, the end surface of the glass block which is adjacent to the object side has the three functions of passing the photographing light, passing the distance measuring light and totally reflecting the distance measuring light.

According to the above-described construction, the same half-mirror and the same end surface of the same glass block are used for beam projection and light reception and this leads to ease of manufacture. The light-emitting device and the light-receiving device, of course, comprise ones disposed asymmetrically to each other with respect to the optical axis in accordance with the improvements described in connection with FIGS. 12 and 13, whereby part of the light travelling from the light-emitting device toward the object is inner-surface-reflected within the glass block or within the lens portion having the focusing function and does not arrive at the object and thus, it becomes possible to prevent creation of light travelling toward the photoelectric light-receiving device, namely, so-called ghost.

As has been described above in detail, by adopting a construction in which a glass block as described above is provided between the lens portion including a lens portion having the focusing function and the subsequent lens portion installed adjacent to the image side whereby beam projection and light reception may be effected, there can be realized a lens system containing therein a compact, active, automatic in-focus detecting device.

Figures 21, 21A:
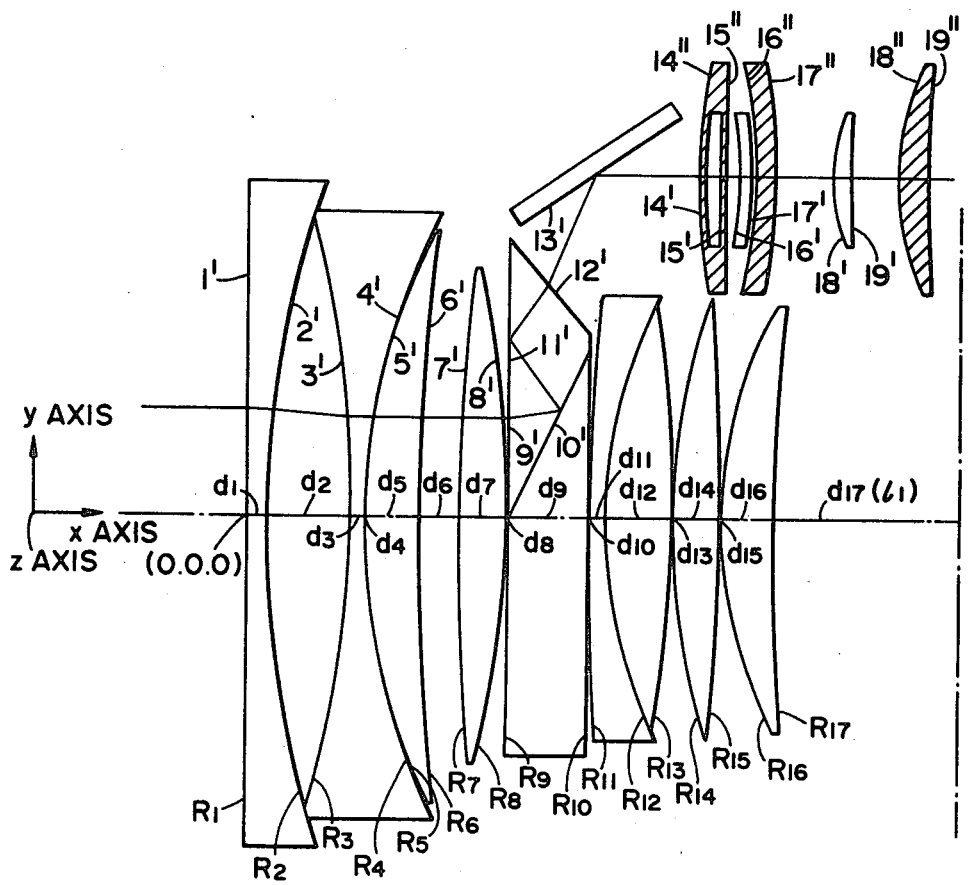
FIG. 21A and FIG. 21B show an embodiment of the optical system according to the present invention.
Figure 21B:
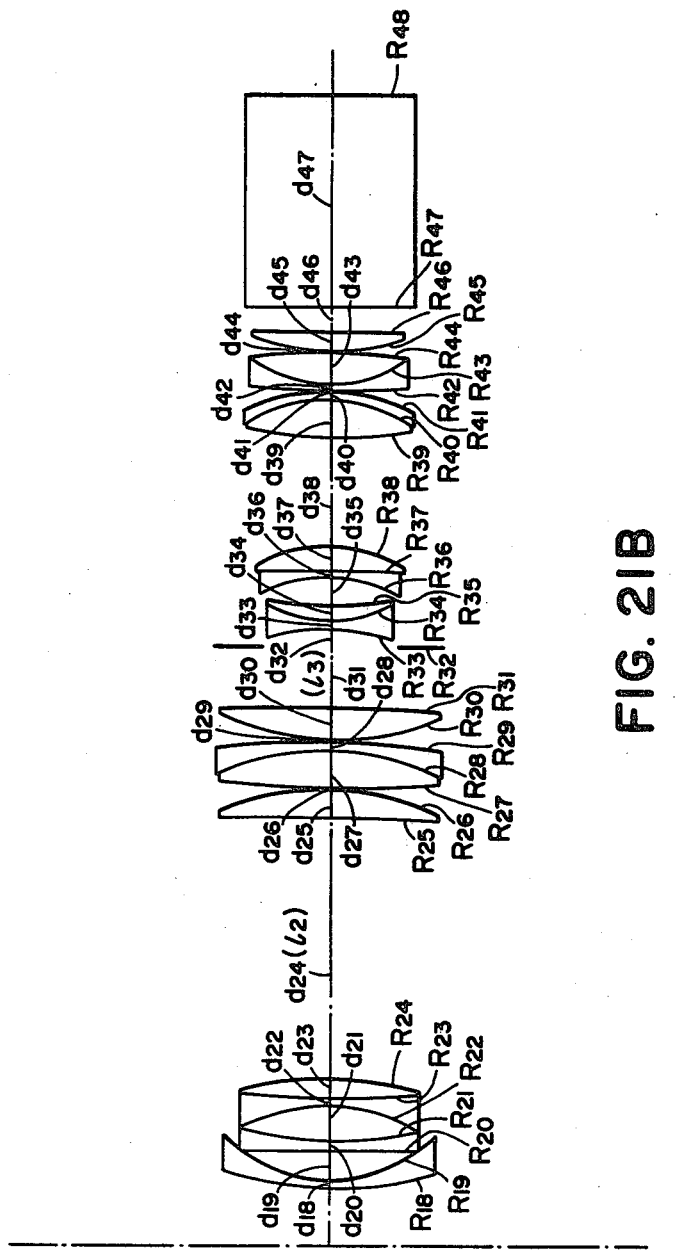
Figure 22:
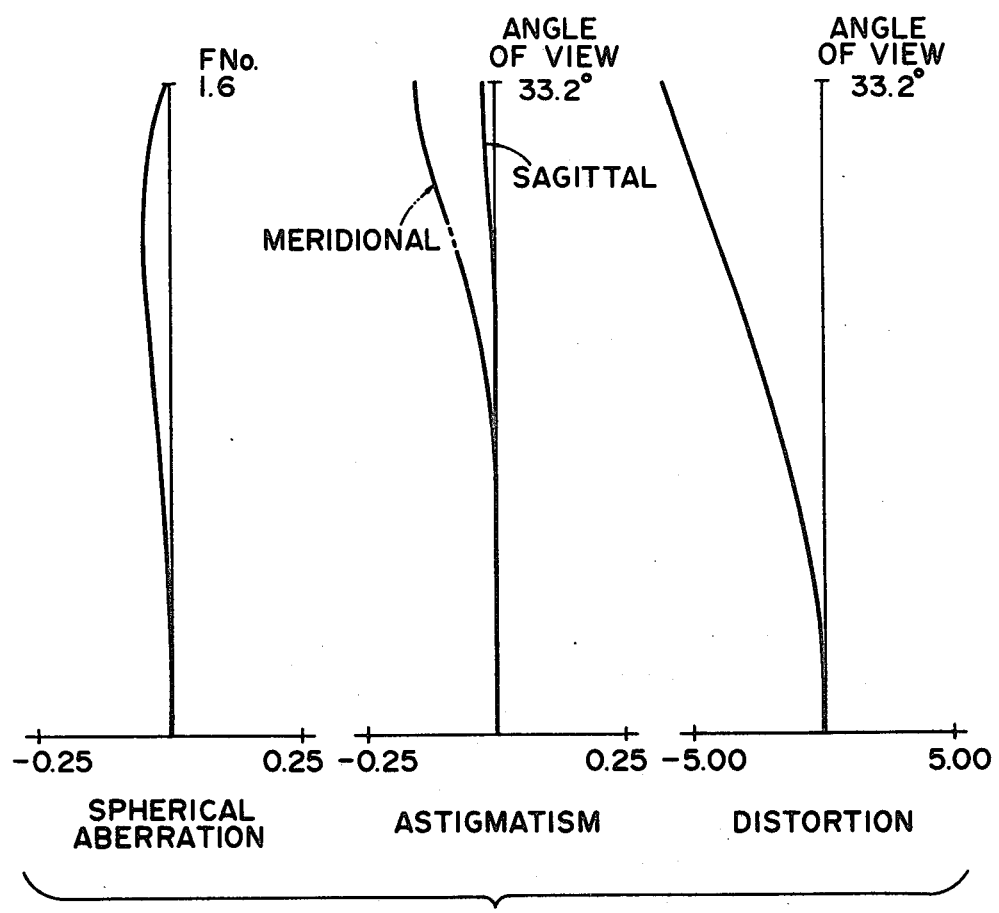
FIGS. 22, 23 and 24 illustrate various aberrations in the respective focal lengths of the optical system shown in FIG. 21, FIG. 22 showing the aberrations at the wide end, FIG. 23 showing the aberrations in the intermediate condition, and FIG. 24 showing the aberrations at the telephoto end.
Figure 23:
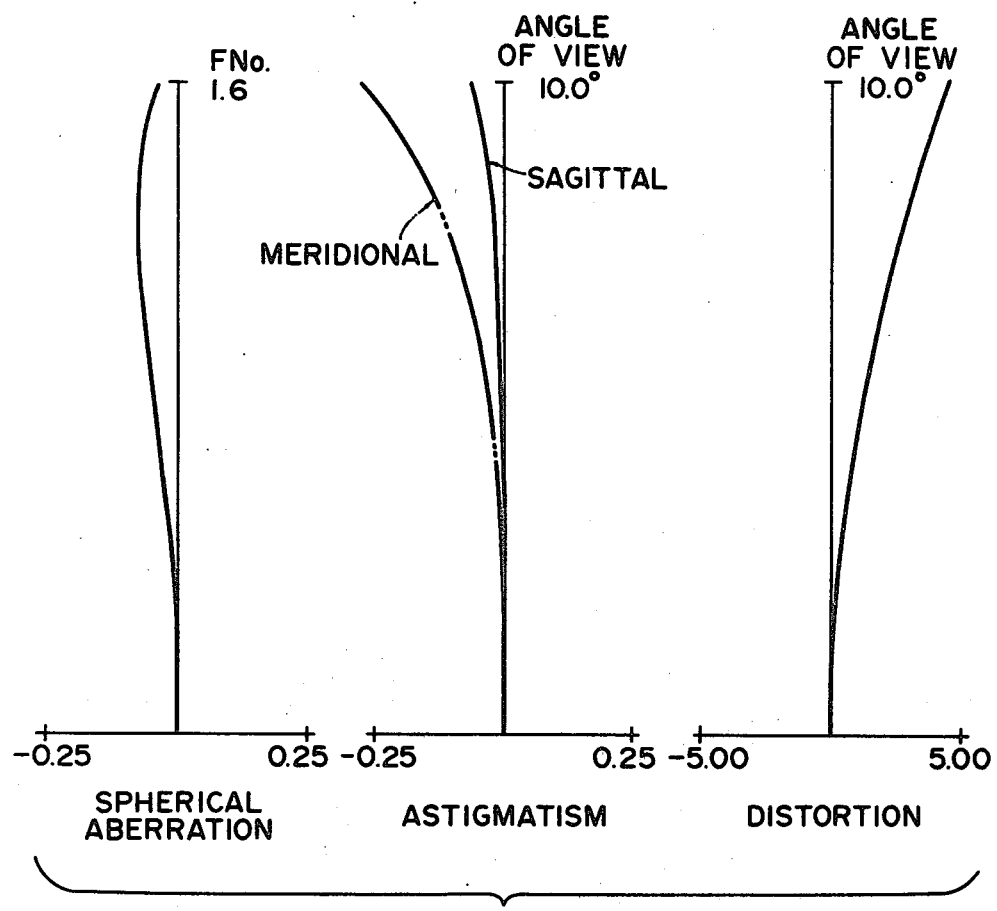
Figure 24:
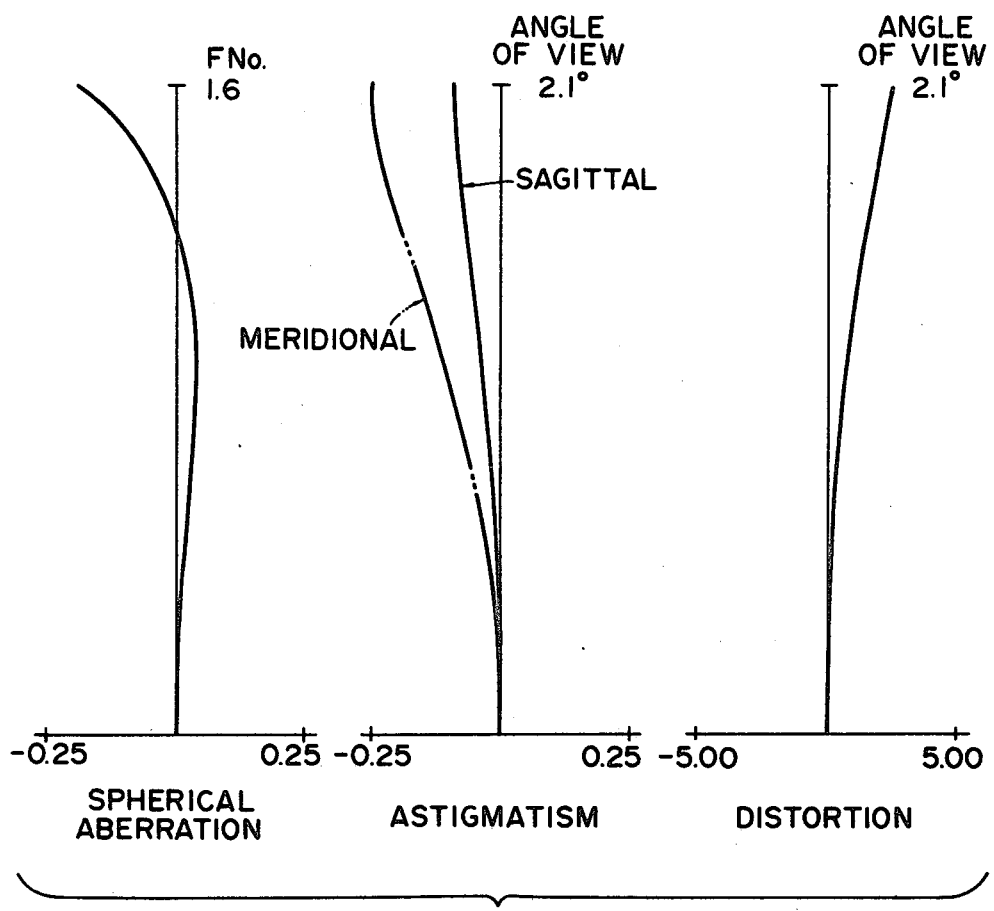
Figure 25:
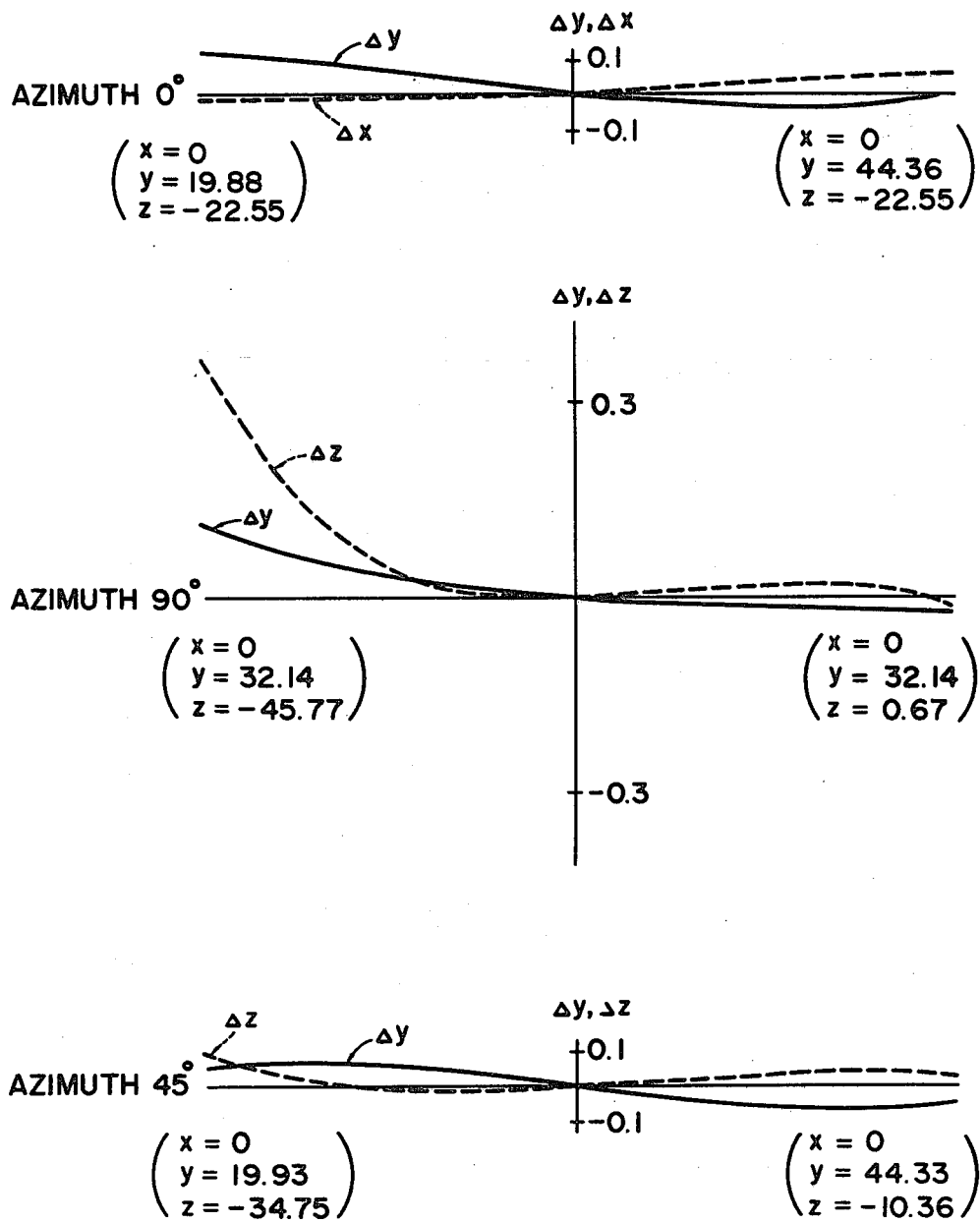
FIG. 25 illustrates the lateral aberration in the beam-projecting system of the optical system shown in FIG. 21.
Figure 26:
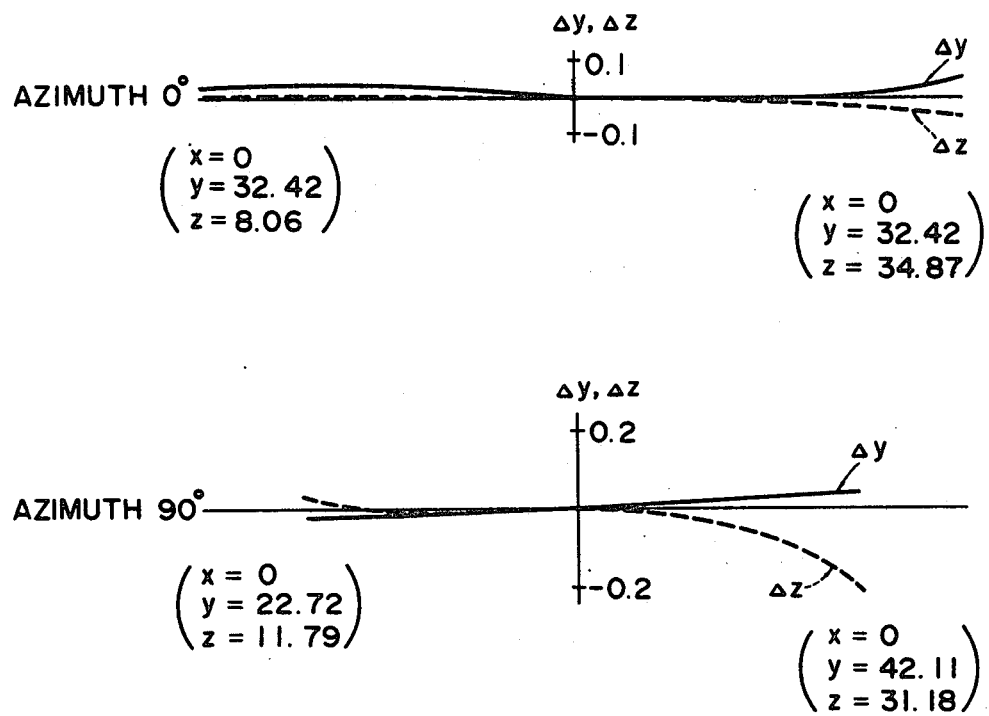
FIG. 26 illustrates the lateral aberration in the light-receiving system of the optical system shown in FIG. 21.

FIG. 21 shows a cross-section of an embodiment of the optical system according to the present invention. R1–R48 constitute an phototaking optical system, 1'–13' and 14''–19'' constitute a beam-projecting system, and 1'–13' and 14'–19' constitute a light-receiving system. R9 and R10 designate a glass block, and 10' denotes a half-mirror. Reference numeral 13' designates a mirror for changing the directions of light beams for beam projection and light reception, and 14''–19'' and 14'–19' denote auxiliary lenses. The data regarding the radius of curvature R of the phototaking optical system, the thickness or spacing α and the refractive indices of glass materials are shown in Table 1 below, the radii of curvature of the auxiliary lenses of the beam-projecting system, the thickness or spacing, the refractive indices of glass materials, the vertex coordinates of each surface of the light-projecting system, and the cosine in the direction of the normal are shown in Table 2 below, and those of the light-receiving system are shown in Table 3 below. With the vertex of the first surface of the phototaking optical system as the origin, the optical axis has been defined as x-axis, and provision has been made of y-axis orthogonal to the optical axis in the plane of the drawing sheet and z-axis orthogonal to the plane of the drawing sheet and the optical axis. The imaging characteristics of the respective systems are shown in FIGS. 22–26.

TABLE 1

Data of Phototaking Optical System

| Surface No. | Curvature of Radius (R) | Thickness or Spacing (d) | Dispersion (νd) | Refractive index (d line) |
|---|---|---|---|---|
| 1 | 0.0 | 5.50 | 55.50 | 1.69680 |
| 2 | 316.49 | 26.01 | | 1. |
| 3 | −336.67 | 5.00 | 60.10 | 1.64000 |
| 4 | 202.96 | 0.21 | | 1. |
| 5 | 196.47 | 16.34 | 27.50 | 1.75520 |
| 6 | 712.95 | 1.20 | | 1. |
| 7 | 683.20 | 15.10 | 60.30 | 1.62041 |
| 8 | −320.94 | 0.50 | | 1. |
| 9 | 0.0 | 25.00 | 64.10 | 1.51633 |
| 10 | 0.0 | 0.50 | | 1. |
| 11 | 1183.49 | 4.50 | 25.40 | 1.80518 |
| 12 | 152.98 | 20.27 | 70.10 | 1.48749 |
| 13 | −436.16 | 0.21 | | 1. |
| 14 | 208.11 | 14.90 | 70.10 | 1.48749 |
| 15 | −773.58 | 0.21 | | 1. |
| 16 | 137.39 | 15.79 | 60.30 | 1.62041 |
| 17 | 558.42 | $l_1$ | | 1. |
| 18 | 103.21 | 2.40 | 49.60 | 1.77250 |
| 19 | 42.49 | 9.88 | | 1. |
| 20 | −3061.10 | 2.20 | 49.60 | 1.77250 |
| 21 | 87.01 | 12.46 | | 1. |
| 22 | −47.16 | 2.20 | 49.60 | 1.77250 |
| 23 | 502.93 | 6.29 | 21.30 | 1.92286 |
| 24 | −94.96 | $l_2$ | | 1. |
| 25 | −778.37 | 8.92 | 70.10 | 1.48749 |
| 26 | −74.07 | 0.30 | | 1. |
| 27 | 383.44 | 12.44 | 60.10 | 1.64000 |
| 28 | −68.98 | 2.40 | 25.40 | 1.80518 |
| 29 | −214.43 | 0.30 | | 1. |
| 30 | 78.29 | 10.22 | 70.10 | 1.48749 |
| 31 | −940.00 | $l_3$ | | 1. |
| 32 | 0.0 | 5.96 | | 1. |
| 33 | −50.25 | 1.40 | 58.60 | 1.65160 |
| 34 | 36.05 | 4.88 | 30.10 | 1.69895 |
| 35 | 71.74 | 9.57 | | 1. |
| 36 | −43.61 | 1.50 | 60.10 | 1.64000 |
| 37 | −3515.26 | 8.73 | 31.10 | 1.68893 |
| 38 | −39.93 | 34.00 | | 1. |
| 39 | 147.43 | 12.33 | 70.10 | 1.48749 |
| 40 | −41.61 | 2.20 | 27.50 | 1.75520 |
| 41 | −55.38 | 0.20 | | 1. |
| 42 | 255.65 | 1.90 | 27.50 | 1.75520 |
| 43 | 39.47 | 9.78 | 51.00 | 1.51118 |
| 44 | −402.28 | 1.10 | | 1. |
| 45 | 63.65 | 5.80 | 70.10 | 1.48749 |
| 46 | 0.0 | 8.30 | | 1. |
| 47 | 0.0 | 69.20 | 64.10 | 1.51633 |
| 48 | 0.0 | 0.0 | | 1. |
| f: Focal Length | | | | |
| /f | 12.2329 | 45.4191 | | 215.2839 |
| $l_1$ | 2.0159 | 74.4159 | | 113.6159 |
| $l_2$ | 171.6342 | 80.8184 | | 1.8083 |
| $l_3$ | 1.5000 | 19.9158 | | 59.7290 |

TABLE 2

Data of Light-Projecting Lens System

| Surface No. | Curvature of Radius (R) | Thickness or Spacing (d) | Refractive index (d line) |
|---|---|---|---|
| 14'' | 223.65 | 8.56 | 1.79116 |
| 15'' | −1328.76 | 9.36 | 1. |
| 16'' | −128.01 | 5.56 | 1.50974 |
| 17'' | −202.12 | 37.64 | 1. |
| 18'' | 84.23 | 9.65 | 1.79116 |
| 19'' | 443.23 | | 1. |

| Surface No. | Vertex Coordinates | | | Direction Cosine | | |
|---|---|---|---|---|---|---|
| | X | Y | Z | X | Y | Z |
| 1' | 0.0 | 0.0 | 0.0 | 1.0000 | 0.0 | 0.0 |
| 2' | 5.50 | 0.0 | 0.0 | 1.0000 | 0.0 | 0.0 |
| 3' | 31.51 | 0.0 | 0.0 | 1.0000 | 0.0 | 0.0 |
| 4' | 36.51 | 0.0 | 0.0 | 1.0000 | 0.0 | 0.0 |
| 5' | 36.72 | 0.0 | 0.0 | 1.0000 | 0.0 | 0.0 |
| 6' | 53.06 | 0.0 | 0.0 | 1.0000 | 0.0 | 0.0 |
| 7' | 54.26 | 0.0 | 0.0 | 1.0000 | 0.0 | 0.0 |

TABLE 2-continued

Data of Light-Projecting Lens System

| | | | | | |
|---|---|---|---|---|---|
| 8' | 69.36 | 0.0 | 0.0 | 1.0000 | 0.0 | 0.0 |
| 9' | 69.86 | 45.00 | 0.0 | 1.0000 | 0.0 | 0.0 |
| 10' | 82.36 | 26.81 | 0.0 | 0.90631 | −0.42262 | 0.0 |
| 11' | 69.86 | 45.00 | 0.0 | −1.0000 | 0.0 | 0.0 |
| 12' | 82.36 | 75.10 | 0.0 | 0.76604 | 0.64279 | 0.0 |
| 13' | 104.86 | 110.00 | 0.0 | −0.48378 | 0.87519 | 0.0 |
| 14" | 145.00 | 109.50 | −29.45 | 1.0000 | 0.0 | 0.0 |
| 15" | 153.56 | 109.50 | −29.45 | 1.0000 | 0.0 | 0.0 |
| 16" | 162.92 | 109.50 | −29.45 | 1.0000 | 0.0 | 0.0 |
| 17" | 168.48 | 109.50 | −29.45 | 1.0000 | 0.0 | 0.0 |
| 18" | 206.12 | 109.50 | −29.45 | 1.0000 | 0.0 | 0.0 |
| 19" | 215.77 | 109.50 | −29.45 | 1.0000 | 0.0 | 0.0 |

Installation Position of Light-Emitting Device
(313.3, 109.5, −29.45)

TABLE 3

Data of Light-Receiving Lens System

| Surface No. | Curvature of Radius (R) | Thickness or Spacing (d) | Refractive index (d line) |
|---|---|---|---|
| 14' | 144.93 | 5.53 | 1.79116 |
| 15' | −853.24 | 6.05 | 1. |
| 16' | −82.59 | 3.60 | 1.50974 |
| 17' | −131.00 | 24.33 | 1. |
| 18' | 53.94 | 6.24 | 1.79116 |
| 19' | 284.81 | | 1. |

| Surface No | Vertex Coordinates | | | Direction Cosine | | |
|---|---|---|---|---|---|---|
| | X | Y | Z | X | Y | Z |
| 1' | 0.0 | 0.0 | 0.0 | 1.0000 | 0.0 | 0.0 |
| 2' | 5 50 | 0.0 | 0.0 | 1.0000 | 0.0 | 0.0 |
| 3' | 31.51 | 0.0 | 0.0 | 1.0000 | 0.0 | 0.0 |
| 4' | 36.51 | 0.0 | 0.0 | 1.0000 | 0.0 | 0.0 |
| 5' | 36.72 | 0.0 | 0.0 | 1.0000 | 0.0 | 0.0 |
| 6' | 53.06 | 0.0 | 0.0 | 1.0000 | 0.0 | 0.0 |
| 7' | 54.26 | 0.0 | 0.0 | 1.0000 | 0.0 | 0.0 |
| 8' | 69.36 | 0.0 | 0.0 | 1.0000 | 0.0 | 0.0 |
| 9' | 69.86 | 45.00 | 0.0 | 1.0000 | 0.0 | 0.0 |
| 10' | 82.36 | 26.81 | 0.0 | 0.90631 | −0.42262 | 0.0 |
| 11' | 69.86 | 45.00 | 0.0 | −1.0000 | 0.0 | 0.0 |
| 12' | 82.36 | 75.10 | 0.0 | 0.76604 | 0.64279 | 0.0 |
| 13' | 104.86 | 110.00 | 0 0 | −0.48378 | 0.87519 | 0.0 |
| 14' | 145.00 | 109.50 | 28.20 | 1.0000 | 0.0 | 0.0 |
| 15' | 150.53 | 109.50 | 28.20 | 1.0000 | 0.0 | 0.0 |
| 16' | 156.58 | 109.50 | 28.20 | 1.0000 | 0.0 | 0.0 |
| 17' | 160.18 | 109.50 | 28.20 | 1.0000 | 0.0 | 0.0 |
| 18' | 184.51 | 109.50 | 28.20 | 1.0000 | 0.0 | 0.0 |
| 19' | 190.75 | 109.50 | 28.20 | 1.000 | 0.0 | 0.0 |

Installation Position of Photoelectric Light-Receiving Device
(250.4, 109.5, 28.2)

According to the improvements of the present invention, as has been fully described above, by installing the beam-projecting system and the light-receiving system with respect to the imaging optical system in the described manner, it becomes possible to process only the signal provided by the light beam reflected by the surface of an object while avoiding the adverse influence of ghost or flare and consequently, highly accurate and precise detection of reflected light becomes possible. Also, as the result of ghost or flare being completely eliminated, highly accurate detection becomes possible even for a weak reflection signal light in a case where the object lies at a long distance and moreover it is of a low reflection factor, and accordingly, the range of detectable distance and the range of reflection factor which are the essential problems peculiar to an active focus detecting device can be greatly expanded. Also, the types of the imaging optical system to which such TTL type active focus detecting device is applicable have heretofore been greatly limited due to the aforementioned ghost or flare, whereas such limitations are entirely eliminated by the present invention and accordingly, designing and adjustment of the entire system becomes very much easier. In the embodiments (FIGS. 12 and 13), the shapes of the beam-projecting and light-receiving imaginary openings are shown as the same circular configuration, whereas the shapes of these imaginary openings may be arbitrary and the beam-projecting system and the light-receiving system may be set independently of each other. Particularly, in the embodiment of FIG. 12, the two imaginary openings are set so as to lie at symmetrical positions with respect to the perpendicular segment 1, but again this is a factor which may be arbitrarily chosen for convenience of designing as shown in the embodiments of FIG. 13. Also, in the embodiments, means for setting the beam projecting and light-receiving imaginary openings have respectively been the effective diameters of the beam-projecting and light-receiving lenses, but this may also be set by other means, for example, aperture or mirror configuration and, as will be apparent from the basic principle, the lenses of the beam-projecting and light-receiving systems are not indispensable components.

Also, the construction of the optical system according to the present invention described with particular reference to FIGS. 14–16 and 18–21 is particularly beneficial for making the entire system small and compact and this greatly facilitates the incorporation of the TTL type active distance measuring or focus detecting device into a lens system.

Of course, the present invention is never restricted to the illustrated embodiments, but various modifications may be made without departing from the spirit of the invention as defined in the appended claims.

What we claim is:

1. An optical device including:
   (a) an imaging optical system having an optical axis;
   (b) radiation projecting means arranged to project radiation outwardly through a first area of said imaging optical system; and
   (c) radiation receiving means arranged to receive the reflected radiation of said projected radiation through a second area of said imaging optical system;
   said second area being set outside of two fan-shaped areas which are defined by two linearly extended lines, each connecting the optical axis and a point located at an outermost position of said first area as viewed from said optical axis.

2. An optical device according to claim 1, wherein said first area of said imaging optical system through which the radiation from said radiation projecting means passes and said second area of said imaging optical system through which the reflected radiation received by said radiation receiving means passes are set within one half area of said imaging optical system.

3. An optical device according to claim 2, wherein said first area of said imaging optical system through which the radiation from said radiation projecting means passes and said second area of said imaging optical system through which the reflected radiation received by said radiation receiving means passes are set substantially symmetrically with respect to a plane including the optical axis of said imaging optical system.

4. An optical device according to claim 1, 2 or 3, wherein said radiation projecting means has a source of radiation emitting said radiation, and said radiation receiving means has a radiation-responsive device responsive to said reflected radiation, said source of radiation and said radiation-responsive device being disposed in mutually conjugate relationship with respect to said imaging optical system.

5. An optical device according to claim 4, further including:
optical means for directing the radiation by total reflection; and
wherein said radiation projecting means includes a first portion of said optical means, said first portion is arranged to direct the radiation from said source of radiation to said first area of said imaging optical system by at least one total reflection, said radiation receiving means includes a second portion of said optical means, and said second portion is arranged to direct said reflected radiation passed through said second area of said imaging optical system to said radiation-responsive device by at least one total reflection.

6. An optical device according to claim 5, wherein said optical means has a pair of parallel flat surfaces for directing the radiation by total reflection, and said radiation projecting means and said radiation receiving means include a pair of different portions of said pair of parallel flat surfaces as said first and second portions.

7. A device for detecting the focused condition of an imaging optical system with respect to an object, said imaging optical system having an optical axis, said device including:
(a) radiation projecting means arranged to project radiation onto said object through a first area of said imaging optical system; and
(b) radiation receiving means arranged to receive the reflected radiation of said projected radiation from said object through a second area of said imaging optical system, the entrance condition of said reflected radiation to said radiation receiving means varying correspondingly to the focused condition of said imaging optical system with respect to said object, said radiation receiving means generating an electrical signal corresponding to the entrance condition of said reflected radiation;
said second area being set outside of two fan-shaped areas which are defined by two linearly extended lines, each connecting the optical axis and a point located at an outermost position of said first area as viewed from said optical axis.

8. A device according to claim 7, wherein said first area of said imaging optical system through which the radiation from said radiation projecting means passes and said second area of said imaging optical system through which the reflected radiation received by said radiation receiving means passes are set within one half area of said imaging optical system.

9. A device according to claim 8, wherein said first area of said imaging optical system through which the radiation from said radiation projecting means passes and said second area of said imaging optical system through which the reflected radiation received by said radiation receiving means passes are set substantially symmetrically with respect to a plane including the optical axis of said imaging optical system.

10. A device according to claim 7, 8 or 9, wherein said radiation projecting means has a source of radiation for emitting said radiation, and said radiation receiving means has a radiation-responsive device responsive to said reflected radiation, said source of radiation and said radiation-responsive device being disposed in mutually conjugate relationship with respect to said imaging optical system.

11. A device according to claim 10, wherein said imaging optical system is adjustable along said optical axis to form the image of said object on a prearranged focal plane, and said source of radiation and said radiation-responsive device are disposed at positions conjugate with respect to said prearranged focal plane.

12. A device according to claim 11, further including:
optical means for directing the radiation by total reflection; and
wherein said radiation projecting means includes a first portion of said optical means, said first portion is arranged to direct the radiation from said source of radiation to said first area of said imaging optical system by at least one total reflection, said radiation receiving means includes a second portion of said optical means, and said second portion is arranged to direct said reflected radiation passed through said second area of said imaging optical system to said radiation-responsive device by at least one total reflection.

13. A device according to claim 12, wherein said optical means has a pair of parallel flat surfaces for directing the radiation by total reflection, and said radiation projecting means and said radiation receiving means include a pair of different portions of said pair of parallel flat surfaces as said first and second portions.

14. An optical device including:
(a) an optical system having an optical axis;
(b) a source of radiation for emitting radiation;
(c) a radiation-responsive device responsive to said radiation;
(d) first optical means arranged to project the radiation from said source of radiation outwardly through a first area of said optical system; and
(e) second optical means arranged to cause the reflected radiation of said projected radiation coming through a second area of said optical system to enter said radiation-responsive device;
said second area being set outside of two fan-shaped areas which are defined by two linearly extended lines, each connecting the optical axis and a point located at an outermost position of said first area as viewed from said optical axis.

15. An optical device according to claim 14, wherein said first and second areas of said optical system are set within one half area of said optical system.

16. An optical device according to claim 15, wherein said first and second areas of said optical system are set substantially symmetrically with respect to a plane including the optical axis of said optical system.

17. A device for detecting the focused condition of an imaging optical system with respect to an object, said imaging optical system having an optical axis, said device including:
(a) a source of radiation for emitting radiation;
(b) a radiation-responsive device responsive to said radiation, said radiation-responsive device generating an electrical signal corresponding to the entrance condition of the radiation to said radiation-responsive device;
(c) first optical means arranged to project the radiation from said source of radiation toward said object through a first area of said imaging optical system; and
(d) second optical means arranged to cause the reflected radiation from said object coming through a second area of said imaging optical system to enter said radiation-responsive device, the entrance condition of said reflected radiation to said radiation-responsive device varying in accordance with the focused condition of said imaging optical system with respect to said object;

said second area being set outside of the two fan-shaped areas which are defined by two linearly extended lines, each connecting the optical axis and a point located at an outermost position of said first area as viewed from said optical axis.

18. A device according to claim 17, wherein said first and second areas of said optical system are set within one half area of said optical system.

19. A device according to claim 18, wherein said first and second areas of said optical system are set substantially symmetrically with respect to a plane including the optical axis of said optical system.

20. A device according to claim 17, 18 or 19, wherein said imaging optical system is adjustable along said optical axis to form the image of said object on a prearranged focal plane, and said source of radiation and said radiation-responsive device are disposed at positions conjugate with said prearranged focal plane and in mutually conjugate relationship.

21. An optical system including:
   (a) a lens group having an optical axis;
   (b) a source of radiation for emitting radiation;
   (c) a radiation-responsive device responsive to said radiation; and
   (d) an optical member arranged to project the radiation from said source of radiation outwardly through a first area of said lens group and to cause the reflected radiation of said projected radiation coming through a second area of said lens group to enter said radiation-responsive device, said optical member having a pair of parallel flat surfaces for directing the radiation by total reflection, said optical member directing the radiation from said source of radiation to the first area of said lens group and from the second area of said lens group to said radiation-responsive device by at least one total reflection on at least one of said pair of parallel flat surfaces;

said second area being set outside of two fan-shaped areas which are surrounded by two linearly extended lines, each connecting the optical axis and a point located at an outermost position of said first area as viewed from said optical axis.

22. An optical system according to claim 21, wherein said first and second areas of said lens group are set within one half area of said lens group.

23. An optical system according to claim 22, wherein said first and second areas of said lens group are set substantially symmetrically with respect to a plane including said optical axis.

24. An optical system according to claim 21, 22 or 23, wherein said lens group has a prearranged focal plane, and said source of radiation and said radiation-responsive device are disposed at positions conjugate with said prearranged focal plane and in mutually conjugate relationship.

25. A zoom lens assembly comprising:
   (a) a lens system including a zooming lens group operable for effecting zooming and a focusing lens group having an optical axis and operable for effecting focusing of the whole lens system onto an object;
   (b) a radiation source for generating a radiation ray;
   (c) a radiation sensor responsive to the radiation ray generated by said radiation source; and
   (d) an optical system positioned between said focusing lens group and said zooming lens group of said lens system; said optical system being arranged for projecting the radiation ray generated by said radiation source toward said object through a first portion of an effective aperture of the focusing lens group and to cause at least a part of the radiation ray which is reflected by the object and then enters through a second portion of the effective aperture of the focusing lens group, to be directed to said radiation sensor;

said second portion being set outside of two fan-shaped areas which are defined by two linearly extended lines, each connecting the optical axis and a point located at an outermost position of said first portion as viewed from said optical axis.

26. A zoom lens assembly according to claim 25, wherein said first and second portions are set within one half area of said effective aperture.

27. A zoom lens assembly according to claim 26, wherein said first and second portions are set substantially symmetrically with respect to a plane including to said optical axis of the focusing lens group.

28. A zoom lens assembly according to claim 25, 26 or 27, wherein said optical system includes:
   an optical member having a pair of parallel flat surfaces for directing the radiation ray by total reflection, said optical member being arranged to direct the radiation ray from said radiation source to said first portion of the aperture of the focusing lens group and from said second portion of the aperture of the focusing lens group to said radiation sensor by at least one total reflection on at least one of said pair of parallel flat surfaces.

29. A zoom lens assembly according to claim 28, wherein said focusing lens group has a prearranged focal plane, and said radiation source and said radiation sensor are disposed at positions conjugate with said prearranged focal plane and in mutually conjugate relationship.

30. An optical device comprising:
   (a) an imaging optical system for forming an image of an object on a predetermined plane;
   (b) radiation projecting means arranged at the rear of an optical system $L_1$ which is at least a part of said imaging optical system and provided with a radiation source and an optical member to be used for projecting the radiation, said projecting optical member being arranged to project radiation from said radiation source to the object through a first area which is a part of an area S where the radiation of said imaging optical system may pass through; and
   (c) radiation receiving means arranged at the rear of an optical system $L_2$ which is at least a part of said imaging optical system and provided with a radiation sensor and an optical member to be used for receiving the radiation, said receiving optical member being arranged to receive a part of the reflected radiation from said radiation source through a second area which is a part of said area S;

said second area being set outside of two fan-shaped areas which are defined by two linearly extended lines each connecting the optical axis and a point located at an outermost position of said first area as viewed from said optical axis.

31. An optical device according to claim 30, wherein both said projecting optical member and said receiving optical member have reflecting members, both of said optical systems $L_1$ and $L_2$ have a common optical system, and the distance between said radiation source and said common optical system is the same as the distance between said radiation sensor and said common optical system.

* * * * *

UNITED STATES PATENT AND TRADEMARK OFFICE
CERTIFICATE OF CORRECTION

PATENT NO. : 4,455,065

DATED : June 19, 1984

INVENTOR(S) : YUKICHI NIWA, ET AL.

It is certified that error appears in the above-identified patent and that said Letters Patent is hereby corrected as shown below:

Column 1, lines 31-32, delete ")" and insert --)-- after "4,357,085".

Column 2, line 48, insert --for example,-- after "1X10$^{-3}$W,";

line 55, "accumuation" should read --accumulation--.

Column 3, line 19, "inter" should read --enters--.

Column 10, line 62, "light-projectin" should read --light-projecting--.

Column 11, line 59, "ight-emitting" should read --light-emitting--.

Column 12, line 63, "ight-receiving" should read --light-receiving--.

Column 19, line 44, "1.000" should read --1.0000--.

UNITED STATES PATENT AND TRADEMARK OFFICE
CERTIFICATE OF CORRECTION

PATENT NO. : 4,455,065
DATED : June 19, 1984
INVENTOR(S) : YUKICHI NIWA, ET AL.

It is certified that error appears in the above-identified patent and that said Letters Patent is hereby corrected as shown below:

Column 24, line 25, Claim 27, delete "to" after "including".

Signed and Sealed this

Twenty-sixth Day of March 1985

[SEAL]

Attest:

DONALD J. QUIGG

Attesting Officer     Acting Commissioner of Patents and Trademarks